United States Patent
Wang et al.

(10) Patent No.: US 8,587,609 B1
(45) Date of Patent: Nov. 19, 2013

(54) ACCURACY-ADAPTIVE AND SCALABLE VECTOR GRAPHICS RENDERING

(75) Inventors: Haohong Wang, San Jose, CA (US); Yunsen Chin, Fremont, CA (US); Li Sha, San Jose, CA (US); Shuhua Xiang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 1148 days.

(21) Appl. No.: 12/510,834

(22) Filed: Jul. 28, 2009

Related U.S. Application Data

(60) Provisional application No. 61/085,488, filed on Aug. 1, 2008, provisional application No. 61/085,729, filed on Aug. 1, 2008.

(51) Int. Cl.
 *G09G 5/00* (2006.01)
 *G09G 5/24* (2006.01)
 *G06T 11/00* (2006.01)

(52) U.S. Cl.
 USPC ........... 345/614; 345/611; 345/612; 345/613; 345/615; 345/616; 345/467; 345/468; 345/469.1

(58) Field of Classification Search
 USPC ......... 345/611, 612, 613, 614, 615, 616, 467, 345/468, 469.1
 See application file for complete search history.

(56) References Cited

U.S. PATENT DOCUMENTS

| | | | |
|---|---|---|---|
| 7,110,003 B2 * | 9/2006 | Doan | 345/611 |
| 2006/0132509 A1 * | 6/2006 | Choe et al. | 345/690 |
| 2006/0146075 A1 * | 7/2006 | Weiss et al. | 345/660 |
| 2007/0188497 A1 * | 8/2007 | Dowling et al. | 345/469 |
| 2007/0216689 A1 * | 9/2007 | Stamm et al. | 345/469 |
| 2007/0216690 A1 * | 9/2007 | Terazono et al. | 345/469.1 |

* cited by examiner

*Primary Examiner* — Jeffrey Chow

(57) ABSTRACT

Embodiments of the present invention provide methods and associated architecture of accuracy adaptive and scalable vector graphics rendering including rendering a graphic comprising a plurality of line segments by processing each of the plurality of line segments in a first pass, and processing each of a plurality of pixels through which the plurality of line segments pass in a second pass, automatically detecting one or more rendering errors of the graphic, and correcting the one or more rendering errors. Other embodiments may be described and/or claimed.

20 Claims, 11 Drawing Sheets

ACCURACY-ADAPTIVE AND SCALABLE VECTOR GRAPHICS RENDERING

CROSS REFERENCE TO RELATED APPLICATIONS

The present application claims priority to U.S. Patent Application No. 61/085,488, filed Aug. 1, 2008, entitled "High-quality Accuracy-adaptive Font Rendering," and to U.S. Patent Application No. 61/085,729, filed Aug. 1, 2008, entitled "A Novel Scalable Vector Graphics Rendering Scheme," the entire specifications of which are hereby incorporated by reference in their entirety for all purposes, except for those sections, if any, that are inconsistent with this specification.

TECHNICAL FIELD

Embodiments of the present invention relate to the field of graphics rendering, and more particularly, to methods and architectures for accuracy adaptive and scalable vector graphics rendering.

BACKGROUND

Generally, images may be rendered using vector graphics schemes for display on a device using an array of pixels. Vector graphics rendering is typically suitable for graphics such as glyphs or fonts, for example, having shapes defined by mathematical functions including, for example, points, lines, or curves or shapes formed by combinations thereof.

Requirements for rendering of such graphics generally challenge the capability of current graphics rendering architecture and techniques. For example, font rendering requirements in the specification for High-Definition/Density Digital Versatile Disk (HD-DVD) call for processing of 1500 characters/second for 15 point font. In another example, font rendering requirements in the specification for Blu-Ray Disc (BD) call for processing of 50 characters/second for 8-72 point fonts and 25 characters/second for 73-144 point fonts. A processor in current vector graphics rendering architecture may be unable to render vector graphics according to such requirements. Furthermore, mechanisms to automatically detect and correct rendering ambiguities or errors may be lacking in current vector graphics rendering techniques and architectures.

SUMMARY

In various embodiments, the present disclosure provides a method comprising rendering a graphic comprising a plurality of line segments by processing each of the plurality of line segments in a first pass, and processing each of a plurality of pixels through which the plurality of line segments pass in a second pass, automatically detecting one or more rendering errors of the graphic, and correcting the one or more rendering errors.

In various embodiments, the present disclosure further provides a processor, a storage medium coupled to the processor, and a module stored on the storage medium, the module configured to render a graphic comprising a plurality of line segments by processing, via the processor, each of the plurality of line segments in a first pass, and processing, via the processor, each of a plurality of pixels through which the plurality of line segments pass in a second pass, wherein the module is further configured to automatically detect one or more rendering errors of the graphic, and correct the one or more rendering errors.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION

The present specification describes a variety of methods and associated architecture of accuracy adaptive and scalable vector graphics rendering. The present specification further describes a hardware accelerated rendering architecture and associated techniques to automatically detect and correct rendering errors with a scalable rendering capability to dynamically adjust a process flow according to available memory, and increase performance of Bezier curve to line segment decomposition and collection of statistics information for associated pixels. The present specification also describes a scalable vector graphics anti-aliasing rendering scheme that implements an area-based pixel coverage filling method. In one aspect, components of the rendering architecture are configured to input vector graphics information in bands and run in parallel to achieve scalability.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The following detailed description includes perspective-based descriptions such as up/down, back/front, left/right, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)." For the purposes of the present invention, the phrase at least one of A, B, and C" means "(A), (B), (C), (A and B), (A and C), (B and C), or (A, B and C)."

The detailed description further includes use of the phrases "in an embodiment," or "in embodiments," which phrases may each refer to one or more of the same or different embodiments. Furthermore, the terms "comprising," "including," "having," and the like, as used with respect to embodiments of the present invention, are synonymous.

Figure 1:
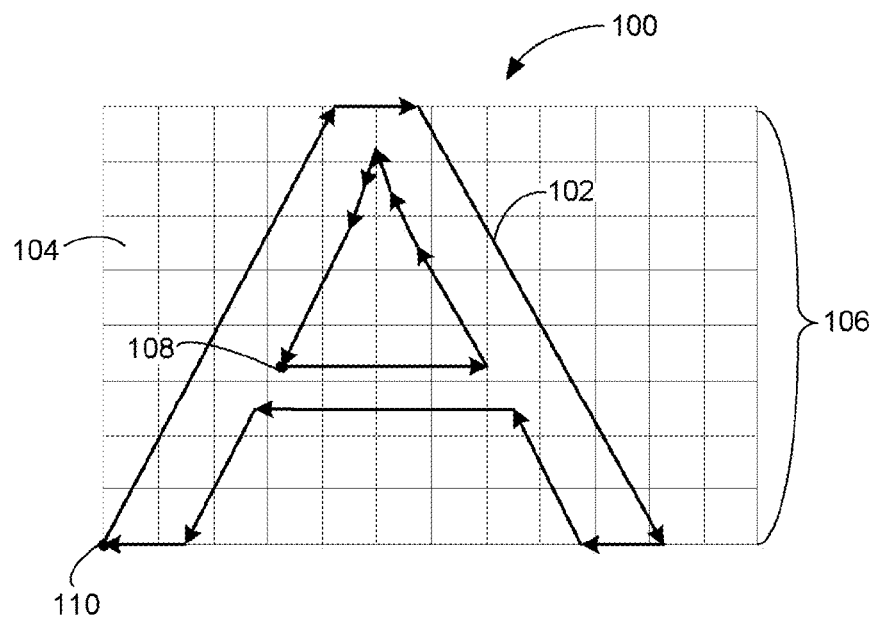
FIG. 1 is a schematic diagram of an example vector graphic.

FIG. 1 is a schematic diagram of an example vector graphic 100. Vector graphic 100 may include, for example, glyphs or fonts having shapes that are defined by mathematical functions including points, lines, or curves or shapes formed by combinations thereof. In an embodiment, vector graphic 100 comprises one or more line segments 102 to form an outline of a shape. A line segment 102 can include an arrow that indicates a direction and/or end point of the line segment 102. Vector graphic 100 can be displayed or otherwise described using a coordinate system such as grid 106, where each square of the coordinate system is representative of a pixel (e.g., pixel 104) or a fraction of a pixel. Coordinates of grid 106 define beginning and ending points for line segments 102 and include conventional x, y coordinates to designate such position. In one embodiment, a given pixel 104 has access to a line segment if the line segment crosses a boundary of the pixel.

According to various embodiments, a shape of a vector graphic 100 is described by an outline comprising one or more contours. An outline can be a glyph as depicted in FIG. 1 and is referred to as a "path" in one or more embodiments described below. Composite paths can be constructed by combining two or more paths. Contours, also referred to as "sub-paths", can include shapes comprising points, lines, and curves. Points of a contour are referred to herein as control points. Referring to FIG. 1, the plurality of line segments that are connected end-to-end starting at point 108 are representative of a first contour, and the plurality of line segments that are connected end-to-end starting at point 110 are representative of a second contour.

Curves can be defined by a series of points. In an embodiment, curves are defined according to Bezier-splines. Such Bezier-splines can include second order or third order formats, but are not limited in this regard. In an embodiment, a Bezier-spline format includes a first type of point that is on the curve and a second type of point that is off the curve. The first and second types of points are used to define one or more curves. Specifically, in one embodiment, combinations of points that are off the curve and/or on the curve can be used to define a curve. Straight lines can be defined by two consecutive points that are on the curve.

In an embodiment, vector graphic 100 is a glyph according to a TrueType or OpenType font, but is not limited in this regard, and can include a variety of other suitable font types in other embodiments. Vector graphic 100 can be defined in accordance with the following Backus-Naur form (BNF) descriptions:

<Glyph>::=<Closed Contour>{<Closed Contour>}
<Closed Contour>::=<Segment>{<Segment>}
<Segment>::=<Line>|<Bezier curve>
<Line>::=<Point><Point>
<Bezier curve>::=<Point><Point><Point>|<Point><Point><Point><Point>
<Point>::=<x>, <y> (x, y may be coordinates of control points)

Embodiments described herein may be used in accordance with a variety of systems and technologies. Rendering architecture and techniques described herein may be used, for example, in HD-DVD, Blu-Ray, and/or internet protocol television (IPTV), technologies. Subject matter is not limited in this regard and other technologies, formats, and/or protocols may be used and/or supported in other embodiments.

Figure 2:
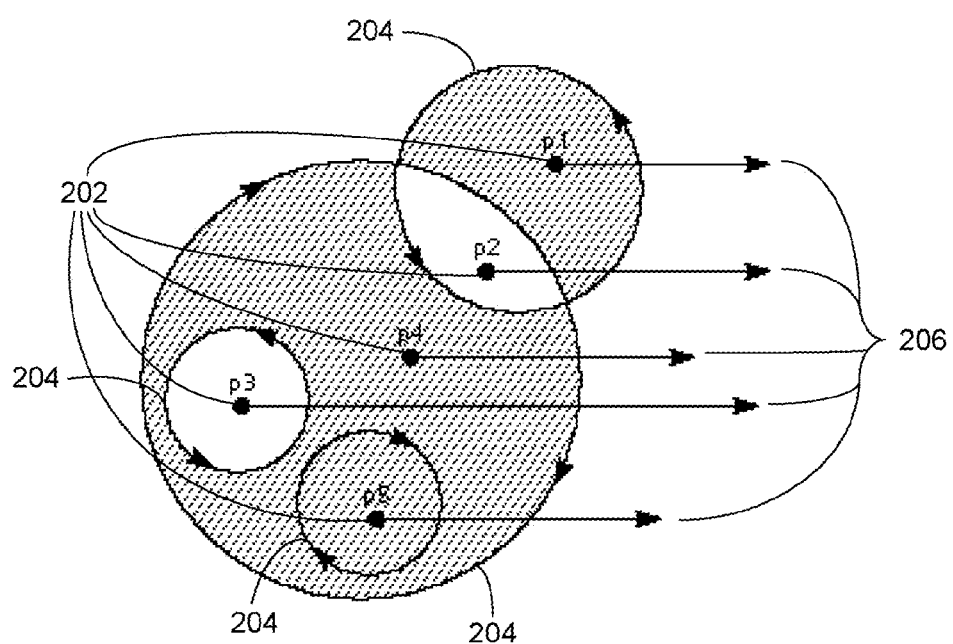
FIG. 2 is a schematic depiction of a point determination technique.

FIG. 2 is a schematic depiction of a point determination technique. One or more points 202 (e.g., points p1, p2, p3, p4, and p5) may be interior or exterior to a glyph. A variety of techniques can be used to determine whether a given point 202 is an interior point or an exterior point. In one embodiment, a point is an interior point of a glyph if the point has a non-zero winding number, otherwise the point in an exterior point.

According to one technique, a winding number can be determined by drawing a ray 206 from a point 202 in question toward infinity. Starting with a count of "0", "1" is subtracted from the count each time a glyph contour 204 having a moving direction crosses the ray 206 from right to left or bottom to top according to the orientation depicted in FIG. 2, where such crossing is termed an "on" transition. "1" is added to the count each time a contour 204 of the glyph crosses the ray 206 from left to right or top to bottom, where such crossing is termed an "off" transition. If the final count is non-zero, then the point 202 is an interior point, else, the point is an exterior point.

Figure 3:
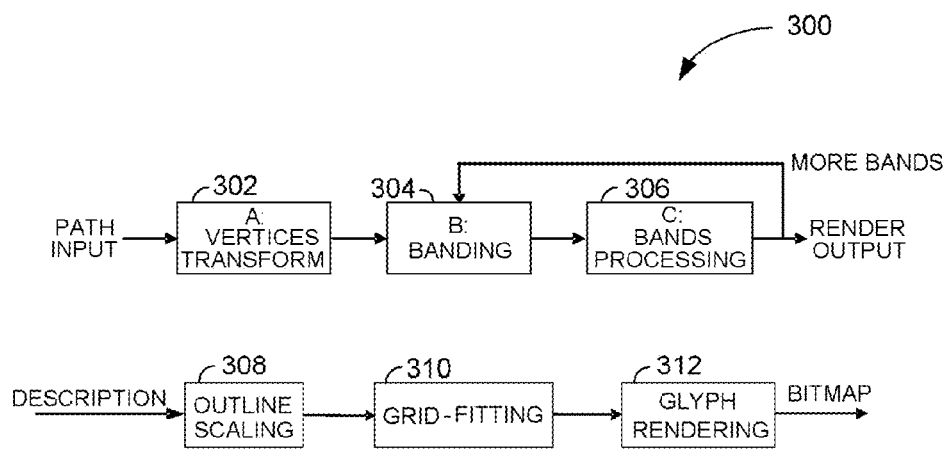
FIG. 3 depicts example rendering process flows for a vector graphic.

FIG. 3 depicts an example rendering process flow 300 for a vector graphic. The rendering process flow 300 includes a vertices transform operation at block 302, a banding operation at block 304, and a bands processing at block 306.

Rendering process flow 300 can include transforming one or more vertices of a path input for target coordination by a transform component. For example, a transform component can partition a composite path into a number of single sub-paths for separate processing and transform path control points. In one embodiment, a transform component performs a one-pass process per path and stores transformed coordinates in memory. A transform component can include a module operatively coupled with a processor such as a central processing unit (CPU), for example, to perform the processing. The memory can include, for example, cache memory in various embodiments.

In one embodiment, a vertices transform operation comprises performing outline scaling at block 308. For example, depending on a desired final font size, coordinates of control points of a graphic can be transformed into a grid, and then down-scaled coordinates can be stored in a fixed point format.

Rendering process flow 300 further includes banding. A banding component can determine a number and size of bands to be processed. The banding component can determine a number of scan lines in a band according to memory limitations such as, for example, the size of available memory for scalability purposes. Banding component can include a module operatively coupled with a processor to perform the actions described herein.

In an embodiment, banding includes grid-fitting at block 310, also referred to as "hinting". Grid-fitting or hinting can include moving outline control points to preserve critical characteristics of the original font design such as, for example, consistent stem weights, consistent color, spacing, and elimination of pixel dropouts, when a glyph is rendered at different sizes on different devices.

According to various embodiments, rendering process flow 300 further includes bands processing, which may include glyph rendering at block 312. Bands processing can be performed by a core component. In one embodiment, a core component processes a band with Bezier decomposition and area-based pixel coverage filling. In one embodiment, a core component includes a micro-code layer configured to iteratively process line segments of a vector graphic with the support of a hardware extension layer to perform Bezier curve decomposition into line segments and calculate pixel coverage impact for a line segment to update statistics information collected for pixels having line segment access.

Glyph rendering can be performed by scan converting to determine whether pixels are interior or exterior to a glyph and calculating a coverage value, such as a grayscale value, of the pixels. The coverage impact on pixels can be calculated line segment by line segment, and then pixels can be filled with calculated coverage values in raster scan order. Rendering process flow 300 is further described in connection with FIGS. 4-6.

Table 1 displays a comparison of computational complexity for font rendering actions described above according to font size, where the percentages shown reflect a percentage of the total task load, according to one embodiment.

TABLE 1

Computational Complexity of Font Rendering Actions

| Font Size | Scaling + hinting | Glyph rendering (grayscale calculation) | Glyph rendering (pixel filling) |
|---|---|---|---|
| 26 point font | 40% | 36-42% | 18-24% |
| 64 point font | 30% | 42-49% | 21-28% |
| 102 point font | 20% | 48-56% | 24-32% |

As shown in Table 1, the computational complexity of down-scaling and hinting can be dependent on font size. For a smaller font size, a larger number of characters can be processed in a given time, resulting in a higher number of characters processed in a given time, further resulting in a higher percentage of time cost for scaling and hinting. Once data are down-scaled from larger grids in to a smaller space, actions of rendering process flow 300 can be performed on the down-scaled grid space.

Figure 4:
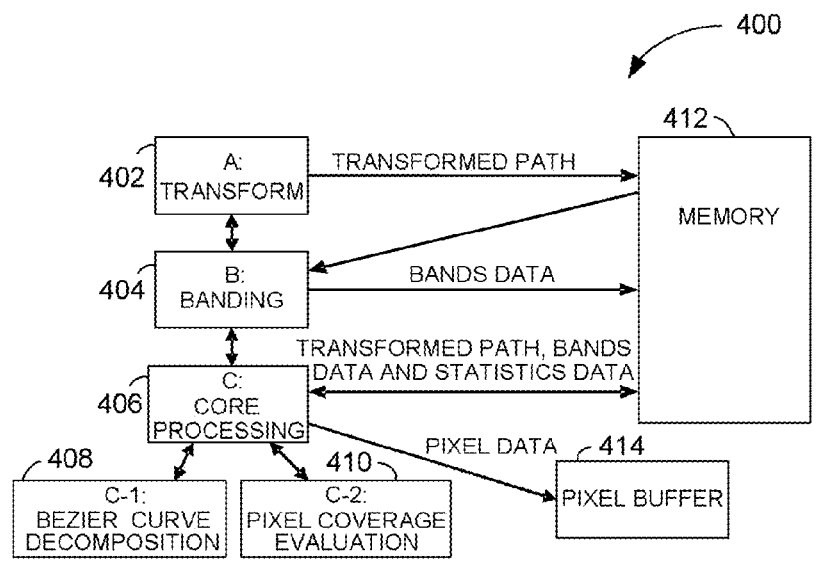
FIG. 4 is a schematic diagram of a graphics rendering architecture.

FIG. 4 is a schematic diagram of a graphics rendering architecture. Rendering architecture 400 comprises a hierarchy of a transform component 402 on top of a banding component 404 on top of a core processing component 406. The core processing component 406 includes extension curve component C-1 408 and coverage component C-2 410. Rendering architecture 400 further includes a memory 412 and pixel buffer 414 coupled with the other components as shown.

Transform component 402 partitions a composite path into a number of single sub-paths for separate processing, and transforms the path control points. In an embodiment, the transformation is a one-pass process per path. A path's control points can be transformed to a display coordination where software may flexibly control a precision of the transformation process. For example, transformed control points of the path can be in floating point format having a particular precision. Such transforming is referred to as "down-scaling" in one or more embodiments.

Transform component 402 loads current path information and conducts vertices transform processes. Information about the control points can be stored in memory 412 for re-use. Information about the control points can include, for example, transformed coordinates such as x, y coordinates and/or point type such as, for example, line, curve start, end point, or curve control point types. Memory 412 can be, for example, cache memory in one or more embodiments, but is not limited in this regard.

Transform component 402 passes a control point memory pointer to banding component 404 to allow the banding component to drive the rendering process. In an embodiment, transform component 402 and banding component 404 communicate with each other using a shared memory location as semaphore mechanism. Banding component 404 determines a number of scan lines in a band according to a size of available memory 412. Banding component determines a number of scan lines in a band according to a size of available memory 412 reserved for statistics information. Banding component 404 schedules the core component 406 to process the control points of the one or more bands.

Core component 406 iteratively processes each line segment with the support of extension curve component 408 and extension coverage component 410, and determines and/or updates the statistics information (such as coverage value) for each pixel. In an embodiment, core component 406 iteratively reads a next point coordinate for a line segment, or two or three more points for respective second order or third order Bezier curves for a band. Core component 406 checks the horizontal and vertical locations of the segment control points, and if all the control points are outside the band area, continues to iteratively read a next point coordinate.

For a curve segment, the core component 406 calls the curve component 408 to decompose the curve into a number of line segments. For a line segment, or for each line segment returned from curve component 408, core component 406 calls the coverage component 410 to calculate a pixel coverage impact of each associated pixel, and updates a pixel coverage value with the coverage impact. Such a process can iterate until all line/curve segments are processed.

Core component 406 conducts coverage filling for all pixels inside a band. Pixel coverage values can be moved by the core component 406 from a data space in memory 412 to pixel buffer 414. Each band can be processed as described until all bands are processed, whereupon the banding component 404 returns control to the transform component 402 to process another path.

Statistics information can be stored in memory 412 according to a variety of data structures. In one embodiment, memory 412 comprises a 64-bit statistics data structure for each pixel, wherein 8 bits are to specify a pixel coverage value, 1 bit to specify whether there is a line segment across the left edge of the pixel, 1 bit to specify the entering or leaving direction of a line segment across the left edge having the top-most intersection point and 12 bits to specify a y-coordinate of the intersection point, 1 bit to specify the entering or leaving direction of a line segment across the right edge having the bottom-most intersection point and 12 bits to specify a y-coordinate of the intersection point, 1 bit to specify the entering or leaving direction of a line segment across the top edge having the left-most intersection point and 12 bits to specify an x-coordinate of the intersection point, and 1 bit to specify the entering or leaving direction of a line segment across the bottom edge having the right-most intersection point and 12 bits to specify an x-coordinate of the intersection point. A statistics data structure is not limited in this regard and may include more or fewer bits having other functionalities in other embodiments.

Curve component 408 can be a hardware extension layer or hardware accelerator configured to receive an input of control points and provide an output of a list of endpoints of converted line segments. In one embodiment, the input for curve component 408 comprises a format of four control points $P_i(x_i, y_i)$ where i=0, 1, 2, 3 for a third order (or cubic) Bezier curve, or comprises a format of three control points $P_i(x_i, y_i)$ where i=0, 1, 2 for a second order (or linear) Bezier curve. Higher order Bezier curves can be implemented according to other embodiments.

An output list of endpoints for converted line segments can be provided by the curve component 408. For example, list of endpoints can be of the form $K_j$ where j=0, 1 . . . n and where n+1 is a number of endpoints after curve component processing.

Figure 5:
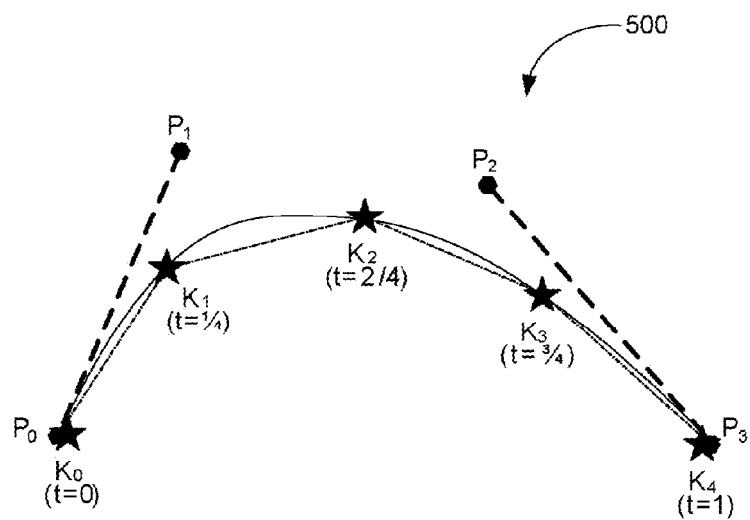
FIG. 5 is an example depiction of a Bezier curve.

Referring to FIG. 5, a cubic Bezier 500 $P_0P_1P_2P_3$ and converted line segments $K_0K_1K_2K_3K_4$, where n=4, are depicted. A cubic Bezier curve can be generally represented by the following, where t belongs to [0,1]:

$$P(t) = (1-t)^3 P_0 + 3t(1-t)^2 P_1 + 3t^2(1-t)P_2 + t^3 P_3 \quad (1)$$
$$= P_0 + 3(P_1 - P_0)t + 3(P_2 - 2P_1 + P_0)t^2 +$$
$$(P_3 - 3P_2 + 3P_1 - P_0)t^3$$

The position of each point of $K_j$ can correspond to t=j/n as depicted in FIG. 5. The value of n can be determined by the following where d(A, B) represents a distance between point A and B:

$$n = [d(P_0, P_3) + d(P_0, P_1) + d(P_1, P_2) + d(P_2, P_3)] >> 1 \quad (2)$$

Equation (2) ensures that n is sufficiently large so that every decomposed line segment cover less than two pixels. To further simplify, n' may be used to replace n, where n'≥n and n' is the closest power of two above n. Equation (1) can be further processed according to the following:

$$P((j+1)/n) = P(j/n) + dP(j/n) \; dP(j/n) = dP((j-1)/n) + d^2P((j-1)/n) \; d^2P((j-1)/n) = d^2P((j-2)/n) + d^3P((j-2)/n)$$
$$d^3P((j-2)/n) = \text{Constant} \quad (3)$$

Thus, the calculation of P(j/n) where j=0, 1 . . . n can be derived by Equation (3) with an initial condition j=0, according to the following:

$$P(0/n) = P0 \; dP(-1/n) = 3(P_1-P_0)n^{-1} - 6(P_2-2P_1+P_0)n^{-2} + 3(P_3-3P_1-P_0)n^{-3} \; d^2P((-2)/n) = 6(P_2-2P_1+P_0)n^{-2} - 12(P_3-3P_2+3P_1-P_0)n^{-3} \; d^3P((-3)/n) = 6(P_3-3P_2+3P_1-P_0)n^{-3} \quad (4)$$

Similarly, a linear Bezier can be represented according to the following:

$$P(t) = (1-t)^2 P_0 + 2t(1-t)P_1 + t^2 P_2 \quad (5)$$
$$= P_0 + 2(P_1 - P_0)t + (P_2 - 2P_1 + P_0)t^2 \quad (t = j/n)$$

and $$n = [d(P_0, P_2) + d(P_0, P_1) + d(P_1, P_2)] << 1 \quad (6)$$

According to various embodiments, curve component 408 is configured to determine n using Equation (2) or (6), calculate the position of each point in the curve following the order of t=j/n where j=0, 1 . . . n, and output the positions in serial. Curve component 408 can perform decomposition of curves into line segments according to other techniques in other embodiments.

Coverage component 410 can be a hardware extension layer or hardware accelerator configured to calculate a coverage impact for a number of pixels having line segment access and update statistics information collected for pixels along the line segment. In one embodiment, each pixel contains a 16×16 grid to provide a coordinate system to describe a position of line segment endpoints. Pixels can include grids with higher or lower resolution according to other embodiments. In one embodiment, start and endpoints of a line segment correspond to different pixels. Coverage component 410 can ignore or discard line segments smaller than a pixel size.

Coverage component 410 receives an input of a coordinate position such as, for example, an (x, y) position of a start or end point of a line segment. A start and end point of a line segment in process can be denoted by $(x_0, y_0)$ and $(x_1, y_1)$, respectively. In one embodiment, coverage component 410 calculates a corresponding pixel position $(px_0, py_0)$ and $(px_1, py_1)$ for respective start and end points of a line segment $(x_0, y_0)$ and $(x_1, y_1)$ according to the following:

$$px_0 = x_0 >> 4$$
$$py_0 = y_0 >> 4$$
$$px_1 = x_1 >> 4$$
$$py_1 = y_1 >> 4 \quad (7)$$

If the start and end points are determined to be in the same pixel, the point $(x_1, y_1)$ is discarded and calculation starts again with the next point. The coverage component 410 can incrementally locate a next pixel for processing by following a direction of a longer edge of the line segment being processed. For example, in one embodiment, a y-direction is followed if $|py_1-py_0|>|px_1-px_0|$, otherwise an x direction is followed. Thus, a next pixel with coordinate $(px_i, py_i)$ can correspond with either of the following:

$$py_i = py_{i-1} + 1$$
$$px_i = px_{i-1} + (px_1-px_0)/(py_1-py_0) \quad (8)$$

or $$px_i = px_{i-1} + 1$$
$$py_i = py_{i-1} + (py_1-py_0)/(px_1-px_0) \quad (9)$$

A coverage impact value, g, can be calculated by the coverage component 410 based on an area of the region in a pixel that is inside a path or glyph. In one embodiment, a moving direction of a line segment is used to indicate that a side of the line segment is inside of a path. For example, a right side of the moving direction of a line segment can be defined to be inside of a path as depicted in vector graphic 100. Other attributes for a moving direction can be defined in other embodiments. Methods to calculate a coverage impact value, g, are further described in connection with FIGS. 12-18.

Coverage component 410 can be configured to determine or update a coverage value such as, for example, a grayscale value of a pixel for rendering. In one embodiment, a coverage value for all pixels is initially set to zero and is updated by the coverage component 410. A pixel coverage value, represented by G(x, y) for a pixel (x, y), can be updated according to the following, where g is a coverage impact value:

$$G(px_i,py_i)=G(px_i,py_i)+g \text{ if } 0G(px_i,py_i)+g \leq 256$$

or $$G(px_i,py_0)=[G(px_i,py_i)+g]-256 \text{ if } G(pxi,pyi)+g>256 \quad (10)$$

Equation (10) includes the number 256 to account for 256 shades of grayscale used in one or more embodiments, however, subject matter is not limited in this regard. Other values can be used to reflect more or less resolution and/or represent types of coverage other than grayscale in other embodiments.

Coverage component 410 can be further configured to update a pixel boundary intersection record. The pixel boundary intersection record can include information about whether a line segment is entering or leaving a pixel. For example, if a start point of a line segment is outside the pixel and an end point of the line segment is inside the pixel, then the line segment is considered to have an entering direction for the pixel. If a start point of a line segment is inside a pixel and an end point of the line segment is outside the pixel, then the line segment is considered to have a leaving direction. If both start and end points of a line segment that accesses a pixel are outside the pixel, then there is no intersection within the pixel. Such actions described with respect to coverage component 410 may be iteratively repeated, pixel by pixel, until $py_i=py_1$ and $px_i=px_1$.

Figure 6:
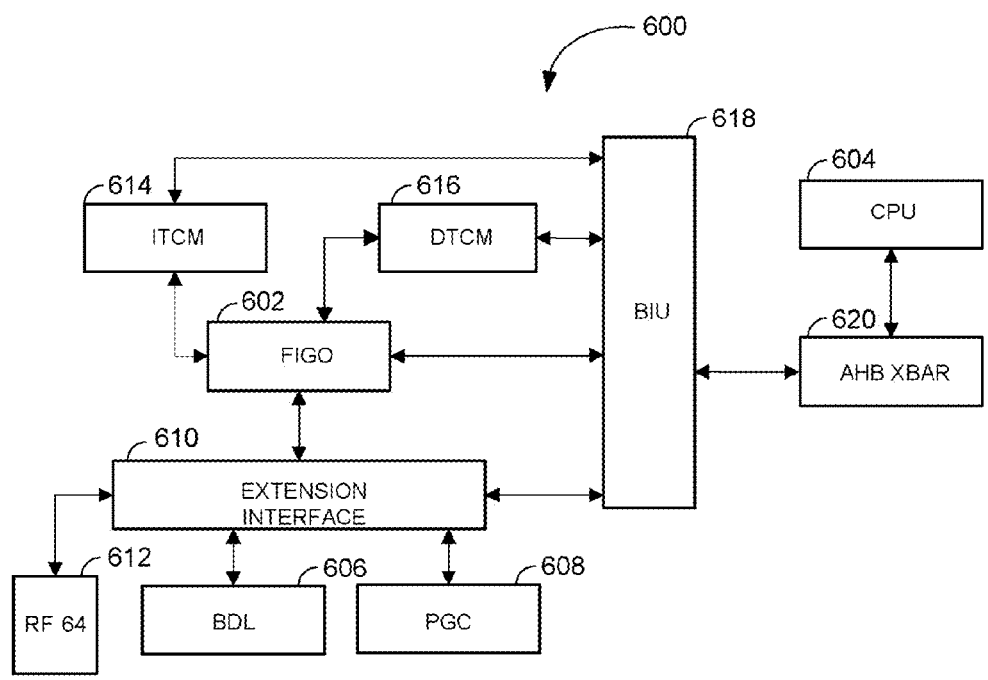
FIG. 6 is another schematic diagram of a graphics rendering architecture.

FIG. 6 is another schematic diagram of a graphics rendering architecture 600. In one embodiment, graphics rendering architecture 600 includes a Flow Instructions Get Optimized (FIGO) micro-code layer or controller 602, hereafter "FIGO," a central processing unit (CPU) software layer 604, and a FIGO hardware extension layer having a first hardware accelerator 606 and a second hardware accelerator 608, operatively coupled together. First hardware accelerator 606 can be configured to provide Bezier decomposition of curves to line segments (BDL), and second hardware accelerator 608 can be configured to calculate pixel coverage such as, for example, pixel grayscale coverage (PGC) in one or more embodiments.

Graphics rendering architecture 600 further comprises a hardware extension interface 610, a register file (RF64) 612, instruction tightly coupled memory (ITCM) 614, data tightly coupled memory (DTCM) 616, bus interface unit (BIU) 618, and advanced high-performance bus (AHB) XBar 620, operatively coupled as shown. Hardware extension interface 610 comprises a non-blocking co-processor interface between FIGO 602 and hardware accelerators 606, 608. Hardware accelerators 606, 608 comprise co-processors in an embodiment and may be referred to as "FIGO extensions." Register file 612 can be a register file for hardware accelerators 606, 608 and can include, for example, a 64×64 bit register array used by FIGO 602 to pass data to hardware accelerators 606, 608.

Memory, such as ITCM 614 and/or DTCM 616, is coupled to FIGO 602. ITCM 614 can include static random access memory (SRAM) and may be disposed on-chip in one or more embodiments to store instructions. DTCM 616 can include SRAM and may be disposed on-chip in one or more embodiments to store local data. Subject matter is not limited in this regard and other types of memory and configurations can be used in other embodiments.

BIU 618 is coupled to FIGO 602 to convert one or more external signals that accord with AHB protocol to internal signals for hardware logic. AHB Xbar 620 can be an x-bar of AHB to support multiple CPUs 604 as masters and distribute to multiple slave devices. Subject matter is not limited in this regard and other types of buses and configurations can be used in other embodiments.

FIG. 6 may depict one of a variety of configurations of graphics rendering architecture suitable to perform methods described herein and subject matter is not limited to the depicted embodiment. Other configurations may be used in other embodiments. Graphics rendering architecture 600 described with respect to FIG. 6 may comport with similarly described components and methods described with respect to graphics rendering architecture 400 of FIG. 4, and vice versa, according to various embodiments.

In one embodiment, graphics rendering architecture 600 is a font engine architecture built on top of FIGO 602 having a number of hardware acceleration modules 606, 608 as FIGO extensions. CPU software layer 604 can perform the transform component 402 processes described with respect to FIG. 4, including, for example, down-scaling processes.

CPU software layer 604 partitions a composite glyph into a number of single glyphs for separate processing and performs glyph down-scaling and hinting processes. A glyph's control points can be stored in a grid having more resolution than needed for a font size. Down-scaling may provide a smaller grid appropriate for the font size. CPU software layer 604 can flexibly control a precision of a down-scaling process. Down-scaled control points of a glyph can be, for example, in floating point format with a particular precision.

Hinting can preserve the regularity of locations and distances of control points of a glyph and/or preserve the proportion of each component to control an appearance of the glyph. A hinting process can include detecting horizontal and vertical line/curve segments in a glyph contour, adjusting locations of start and end points of detected segments such that they fit into the grid, and proportionally adjusting other control points in the contour according to an original location relationship between such control points in the original glyph contour using the relocated start and end points as anchor points.

FIGO 602 iteratively processes each line segment, in a first pass, with support of FIGO extensions BDL 606 and PGC 608, and updates statistics information for each pixel having line segment access. In another pass, FIGO 602 processes each pixel to calculate a coverage value from the statistics. For example, a coverage value can be a grayscale value equal to 256 multiplied by a percentage of area inside the glyph for a pixel having line segment access. FIGO 602 can perform processes described with respect to core processing component 406 of FIG. 4.

FIGO hardware extension BDL 606 performs Bezier curve decomposition into line segments. According to various embodiments, hardware extension BDL 606 performs processes described with respect to curve component 408. FIGO hardware extension PGC 608 calculates pixel coverage impact for a line segment, and updates statistics information collected for pixels having line segment access. According to various embodiments, hardware extension PGC 608 performs processes described with respect to coverage component 410.

Graphics rendering architecture 600 renders a graphic in response to the CPU 604 loading a current character glyph information and conducting down-scaling and hinting processes. The CPU 604 stores control point information into DTCM 616 using 32-bits for each control point, according to one embodiment. DTCM 616 may be analogous to data space of memory 412 described with respect to FIG. 4 and can include a 64-bit data structure for each pixel as described herein. In one embodiment, the DTCM reserves about 2 kilobytes (KB) to store up to about 500 control points for a character. In one embodiment, the CPU 604 is configured to call a software module to handle the rendering process if a number of control points is greater than 500. Subject matter is not limited in this regard and other allocations of memory and threshold values for control points can be used in other embodiments.

CPU 604 passes a memory pointer to the control points information and font size to FIGO 602 to allow FIGO 602 to drive the rendering process. CPU 604 and FIGO 602 can be communicatively coupled using a shared memory location as semaphore mechanism. FIGO 602 calculates a number of scan lines, denoted by s, that can be handled based on memory limitations including, for example, reserved DTCM 616 space and font size. FIGO 602 sets up a valid vertical line range for the next s scan lines and begins processing the control points. In one embodiment, FIGO 602 iteratively reads a next point coordinate for a line segment, or two or three more points for respective second or third order Bezier curves. FIGO 602 checks the vertical location of segment control points and if all are outside the valid line range, FIGO 602 reads a next point coordinate.

FIGO 602 calls BDL module 606 to decompose a curve into a number of line segments. For each returned line segment from BDL 606, FIGO 602 calls PGC 608 to calculate a pixel coverage impact and updates a pixel coverage value with the impact until all line segments have been processed. Then, FIGO 602 conducts pixel coverage filling for all pixels in a valid scan line range. In an embodiment, FIGO 602 moves pixel coverage values from DTCM 616 to a buffer such as, for example, double-data-rate synchronous dynamic random access memory (DDR SDRAM). Subject matter is not limited in this regard and may include other types of memory in other embodiments. Such processing can be iteratively repeated until all scan lines are processed, whereupon FIGO 602 returns control to the CPU 604.

Figure 7:
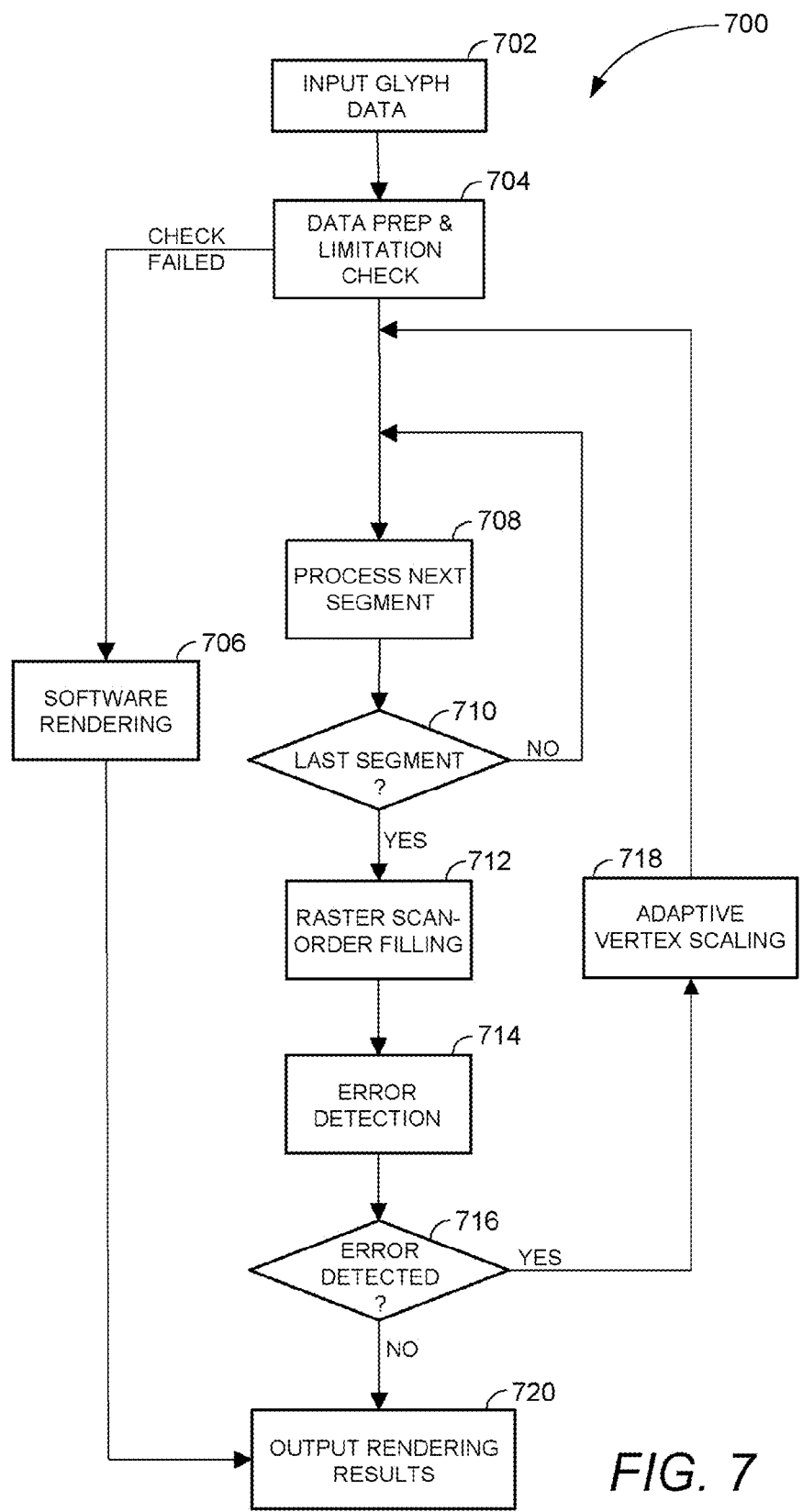
FIG. 7 is a flow diagram of a rendering method for a vector graphic.

FIG. 7 is a flow diagram of a rendering method 700 for a vector graphic. Method 700 includes inputting glyph data at block 702, preparing the data and checking limitations at block 704, rendering by software at block 706 if the check fails, else processing a next segment at block 708, determining whether a segment is a last segment at block 710, raster scan-order filling at block 712, detecting rendering errors at block 714, determining a result based on whether a rendering error was detected at block 716, adaptive vertex scaling at block 718 if an error is detected, and outputting rendering results at block 720 if no error is detected.

Method 700 can provide accuracy-adaptive glyph rendering, wherein the method 700 automatically determines if a current solution is accurate and provides a new solution if the accuracy is not obtained. For example, in one embodiment, method 700 renders a glyph using default data precision, automatically detects errors by determining if a specified glyph accuracy is obtained, and corrects the detected errors by adaptively adjusting the vertex data precision and re-rendering the glyph with higher resolution.

Glyph or path data can be input for rendering according to embodiments described herein. The input data can be prepared for rendering by, for example, transforming, banding, hinting, down-scaling, or otherwise processing the data according to embodiments described herein. One or more limitations can be checked to determine how the input data is to be rendered. In one embodiment, available memory is checked to determine whether the memory is sufficient to support rendering according to embodiments described herein or whether the rendering is to be performed by pure software rendering. If memory is determined to be insufficient, then check 704 fails and pure software rendering, at block 706, is performed.

If check 704 passes, rendering a graphic comprising a plurality of line segments is performed by processing each of the plurality of line segments in a first pass, at block 708, and processing each of a plurality of pixels through which the plurality of line segments pass in a second pass, at block 712. Method 700 further includes automatically detecting, at block 714, one or more rendering errors of the graphic, and correcting the one or more rendering errors by, for example, adaptive vertex scaling, at block 718. If no errors are detected, then the rendering results are output, at block 720.

Processing each of the plurality of line segments, at block 708, can be performed, line segment by line segment, to collect statistics information for each of the plurality of pixels through which the plurality of line segments pass, or in other words, for each of the plurality of pixels that have access to a line segment. In an embodiment, the statistics information includes a coverage impact value. The statistics information can include, for example, information about a pixel such as visited, area, wind strength, and wind area described with respect to FIG. 8.

The processing of each of the plurality of pixels through which the plurality of line segments pass (at block 712) can be performed, in raster scan order, to at least determine a coverage value for each of the plurality of pixels. In one embodiment, a coverage value is a grayscale value determined according to techniques described with respect to FIG. 8.

In one embodiment, error detection 714 of one or more rendering errors of a graphic is performed during the second pass to detect whether at least two of the plurality of line segments have a similar moving direction and pass through a single pixel of the plurality of pixels, wherein such detected condition is indicative of an error. Such error condition is further described with respect to FIG. 9. In one embodiment, error detection 714 is a function of the statistics information collected for each of the pixels having line segment access.

If an error is detected, method 700 provides correction by adaptive vertex scaling 718 and/or re-rendering the graphic at a higher resolution to avoid a condition where two of the plurality of line segments have a similar moving direction and pass through a single pixel of the plurality of pixels. Such correction technique can be iteratively performed until a corrective resolution is obtained.

Various operations are described as multiple discrete actions or operations in turn, in a manner that is most helpful in understanding the claimed subject matter. However, the order of description should not be construed as to imply that these operations are necessarily order dependent. In particular, operations described herein may be performed in a different order and still achieve desirable results. Various additional operations may be performed and/or described operations may be omitted in additional embodiments.

Figure 8:
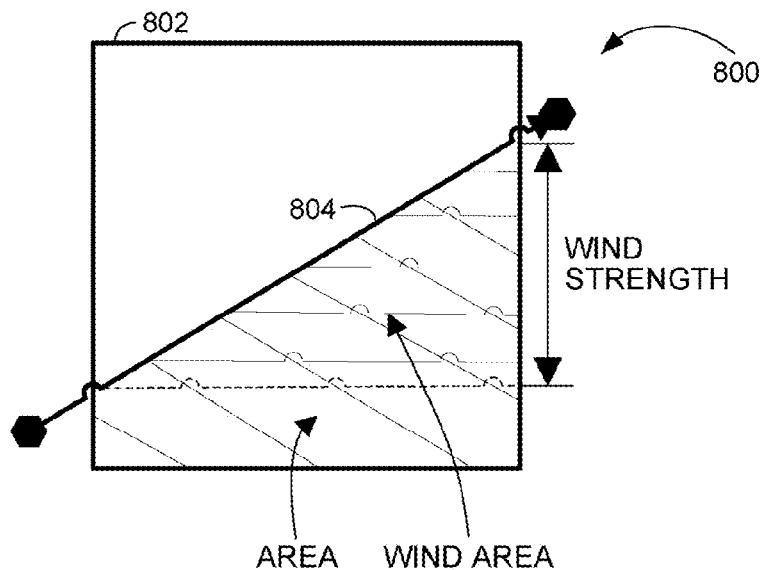
FIG. 8 is a schematic diagram of a pixel with line segment access and associated statistics information.

FIG. 8 is a schematic diagram of a pixel with line segment access and associated statistics information. In an embodiment, pixel 800 depicts a pixel boundary 802 having line segment 804 access and associated statistics information including area, wind area, and wind strength. The area refers to a region within a pixel 800 that is inside of a path or glyph. Wind strength refers to a vertical increment of a line segment 804 inside a current pixel 800. Wind area refers to a vertical area increment along a line segment 804 inside a current pixel 800.

During the first pass of line segment processing described with respect to block 708 of method 700, statistics information can be collected for each pixel 800 along the line segment 804 or through which the line segment 804 passes. In an embodiment, statistics information includes the following: visited, area, wind strength and wind area. Information about whether a pixel 800 is visited or accessed by any line segment 804 is collected. All pixels visited or accessed by any line segment 804 are associated with statistics information that indicates that the pixel 804 is visited.

In the statistics information, area refers to a region within the pixel 800 that is inside of a path or glyph. In one or more embodiments, the right side of the moving direction of a line segment 804 indicates an interior region of a glyph. In the example embodiment depicted in FIG. 8, line segment 804 has a moving direction from left to right across pixel 800, thus, the right side of the line segment 804 bounded by pixel boundary 802 is an area inside of the glyph. In an embodiment, area is a non-negative value.

As depicted in the embodiment of FIG. 8, wind strength refers to a vertical increment of the line segment 804 inside a current pixel 800. Wind strength can be positive or negative depending on the direction of the line segment 804.

Wind area refers to a vertical area increment along a line segment 804 inside the current pixel 800, as depicted, and can be positive or negative depending on the direction of the line segment 804. Let $(x_0, y_0)$ be an intersection point in grid space that a current segment 804 crosses a pixel boundary 802 to enter a pixel 800 and let $(x_1, y_1)$ be an intersection point where a current segment 804 crosses a pixel boundary 802 to leave a pixel 800. The wind area, w(x, y) of such pixel 800 can be calculated according to the following:

$$w(x,y)=((x_1-x_0)*(y_1-y_0))/2$$

The wind strength, s(x, y), can be calculated according to the following:

$$s(x,y)=(y_1-y_0) \quad (12)$$

The statistics information can be obtained, pixel by pixel, along a moving direction of the one or more line segments that form a path. When a pixel is visited by more than one line segment, the wind strength and the wind area can be accumulated. The area can be accumulated and divided by 256 to obtain a remainder, that is, two areas can add together to cancel an entire pixel area to keep the accumulated area within the range of [0, 255]. The value 256 as used throughout this description reflects a particular common number of grayscale shadings. Other ranges and values can be used in other embodiments for other coverage types.

Let (x, y) be a position of a current pixel, s(x, y) the associated wind strength, w(x, y) the associated wind area, and a(x, y) the associated area (e.g., the area of the pixel 800 associated with the visited line segment). Accumulated wind strength, S(x, y), can be calculated according to the following:

$$S(x, y) = \sum_{i=0}^{x} s(x, y) \quad (13)$$

Accumulated wind area, W(x, y), can be calculated according to the following:

$$W(x,y)=|S(x,y)*16-w(x,y)| \bmod 256 \quad (14)$$

In the second pass of method 700, wherein each of the plurality of pixels through which the plurality of line segments pass are processed in raster scan order, a coverage value can be determined, calculated, or updated according to the following equations. For pixels that are not visited by a line segment, a grayscale coverage value, G(x, y), can be derived according to the following:

$$G(x, y) = \begin{cases} 255 & \text{if } |S(x, y)| >= 256 \\ 0 & \text{otherwise} \end{cases} \quad (15)$$

For pixels that are visited by a line segment, a grayscale coverage value can be derived according to the following:

$$G(x, y) = \begin{cases} W(x, y) & \text{if } |W(x, y) - a(x, y)| < 8 \\ W(x, y) & \text{if } |W(x, y) + a(x, y)| > 248 \\ \frac{1}{2}[W(x, y) + a(x, y)] & \text{otherwise} \end{cases} \quad (16)$$

Figure 9:
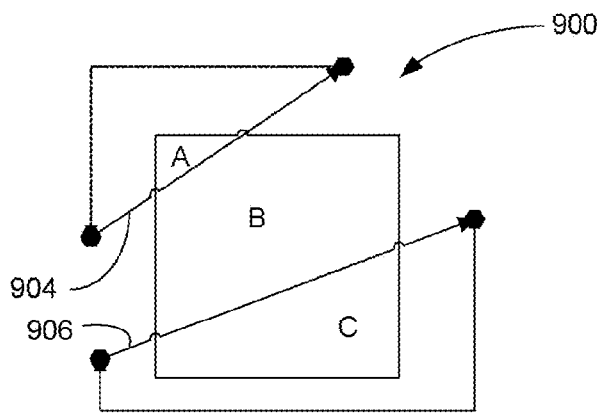
FIG. 9 is a schematic diagram of a pixel having an example error condition.
Figure 9:
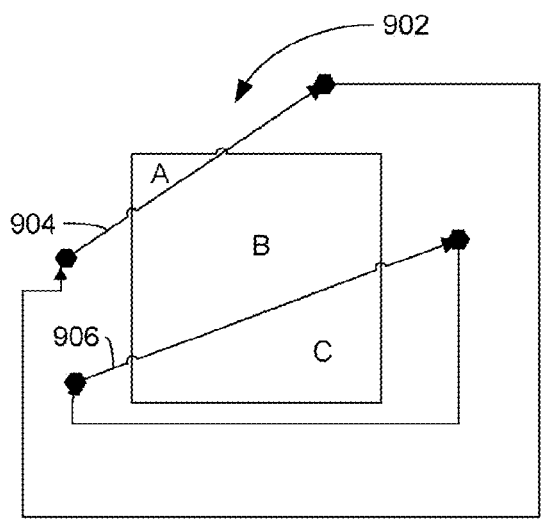

FIG. 9 is a schematic diagram of a pixel having an example error condition. In the second pass of method 700, error detection can be conducted to determine if a pixel's coverage value is calculated incorrectly. A pixel's coverage value can be calculated incorrectly, for example, due to an ambiguity caused by lack of global information from a current pixel's perspective.

In the example ambiguity depicted with respect to pixels 900 and 902 of FIG. 9, two or more line segments 904, 906 have a similar moving direction and pass through a single pixel of the plurality of pixels. Pixels 900 and 902 may represent the same pixel according to two ambiguous interpretations of segment 904. A similar moving direction can include any direction that causes an ambiguity or grayscale calculation error to arise. Such ambiguous condition can cause the calculation of an incorrect grayscale coverage value according to equation (16). For example, W(x, y) and a(x, y) may not obtain a correct grayscale value in light of the ambiguity of calculating statistics information using areas A, B, and C. Tracking all topological relations between contours and pixels to provide needed global information can be too burdensome.

The following error detection criteria are provided to detect symptoms of such ambiguity, where a 1 indicates a detected error and a 0 indicates no detected error:

$$\text{error\_detected} = \begin{cases} 1 & \text{if } s(x, y) > 16 \text{ or } w(x, y) > 256 \\ 1 & \text{if } |W(x, y) - a(x, y)| > 16 \text{ or } |W(x, y) + a(x, y)| < 240 \\ 0 & \text{otherwise} \end{cases} \quad (17)$$

For a detected error, an error correction module can operate to correct the error. In an embodiment, a detected error is corrected by re-processing the glyph rendering at a higher resolution.

Figure 10:
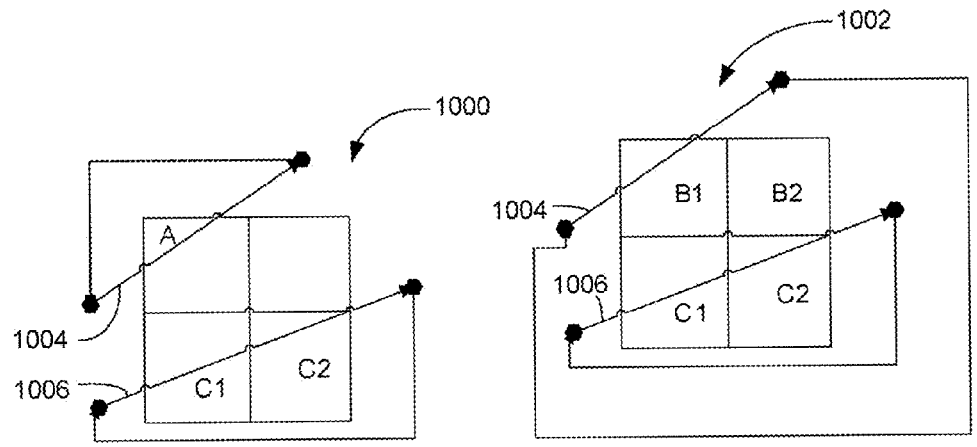
FIG. 10 is a schematic diagram of a pixel implementing a technique to correct an example error condition.

FIG. 10 is a schematic diagram of a pixel implementing a technique to correct an example error condition. A resolution of a pixel having an ambiguous condition or detected error state can be increased and the pixel can be re-rendered at the higher resolution to correctly determine a coverage value for the pixel. The pixels 1000 and 1002 represent the same ambiguity depicted with respect to pixels 900 and 902, but now the resolution of pixels 1000 and 1002 has been increased 2×2 or fourfold to provide four pixels in place of the original single pixel depicted in FIG. 9. Increasing the resolution can include other multiples than 2×2 or fourfold in other embodiments.

According to various embodiments, the resolution is iteratively increased until the ambiguous condition is eliminated.

Increasing the resolution and re-rendering the pixel can provide a correct coverage value because the ambiguous condition of FIG. 9 is eliminated in FIG. 10. For example, the line segments 1004 and 1006 having the same moving direction no longer pass through the same pixel. In FIG. 10, the line segments 1004 and 1006 each pass through different pixels at the higher resolution pixels 1000 and 1002. W(x, y) and a(x, y) can correctly obtain a coverage value, such as grayscale, by calculating statistics information using areas A, B1, B2, C1, C2 of the higher resolution pixels 1000 and 1002.

Figure 11:
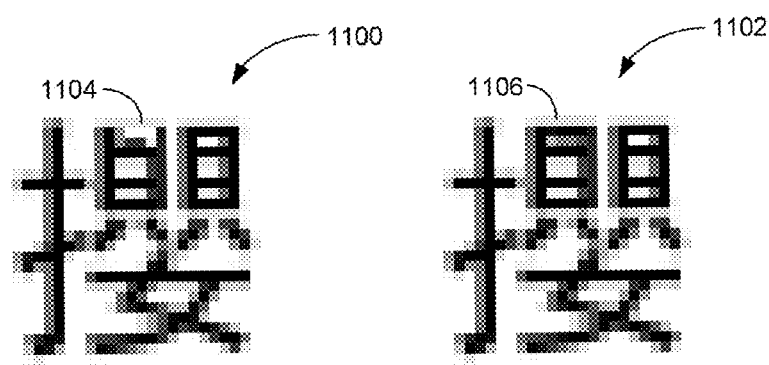
FIG. 11 depicts an example glyph with and without error correction.

FIG. 11 depicts an example glyph with and without error correction. In an embodiment, rendered glyph 1100 represents an example glyph without error correction according to techniques described herein. As depicted, a vacancy exists at region 1104 where an ambiguity as described with respect to FIG. 9 caused an error in grayscale calculation, resulting in a glyph 1100 with reduced visual quality.

Rendered glyph 1102 represents an example glyph with error correction according to techniques described herein. As depicted, a grayscale value was correctly calculated for region 1106, resulting in a glyph 1102 with increased or enhanced visual quality compared to the glyph 1100 without error correction. Error correction can provide a rendered glyph 1102 that more accurately depicts a vector graphic.

Figure 12:
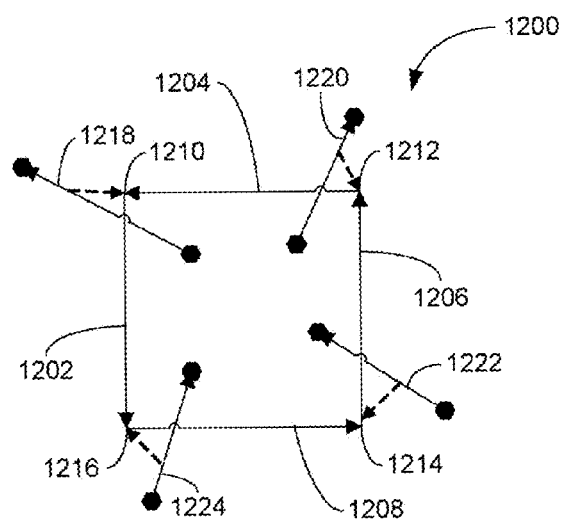
FIG. 12 depicts a corner point detection technique.

FIG. 12 depicts a corner point detection technique. A representative pixel 1200 comprises a left boundary edge 1202, a top boundary edge 1204, a right boundary edge 1206, and a bottom boundary edge 1208. Pixel 1200 further includes a left-top corner point 1210, right-top corner point 1212, right-bottom corner point 1214, and left-bottom corner point 1216. FIG. 12 further depicts a line segment 1218 across the left boundary edge 1202, a line segment 1220 across the top boundary edge 1204, a line segment 1222 across the right boundary edge 1206, and a line segment 1224 across the bottom boundary edge 1208, where a moving direction of the line segments is indicated by the directional arrows at an end of the line segments.

Corner point detection can be part of an area-based pixel coverage filling method to calculate, determine, or update a coverage value of one or more pixels associated with a glyph or path. In an embodiment, pixel 1200 intensity is evaluated according to coverage of a pixel, which can be determined by a calculated area of a glyph or path inside the pixel. According to various embodiments, a pixel coverage filling technique includes determining whether one or more pixel corner points 1210, 1212, 1214, 1216 are inside or outside of a fill area for one or more pixels 1200 having line segment access, in a first pass, and filling the coverage value of unfilled pixels based on a boundary type of filled pixels, in a second pass. Such technique can comport with a Non-Zero Fill Rule as described in section 8.7.1 "Filling Paths" of "OpenVG Specification" Version 1.0.1 and can be adapted to the Even/Odd Fill Rule as described in section 8.7.1 "Filling Paths" of "OpenVG Specification" Version 1.0.1, according to various embodiments.

Pixel corner points 1210, 1212, 1214, 1216 can be inside or outside of a fill area. In one or more embodiments, a determination of whether corner points 1210, 1212, 1214, 1216 are inside or outside of a fill area is dependent on statistics information associated with intersection points of a line segment 1218, 1220, 1222, 1224 and a boundary edge 1202, 1204, 1206, 1208. A coverage component can be configured to determine or detect whether a pixel corner point 1210, 1212, 1214, 1216 is inside or outside of a fill area according to an entering or leaving direction of a line segment.

Table 2 provides a set of conditions to determine whether a corner point is inside a fill area dependent on whether a segment is entering or leaving an adjacent boundary edge, according to one embodiment. For example, for line segment 1224

TABLE 2

Corner Point Detection

| Segment across bottom boundary edge | Left-bottom corner point inside fill area? |
|---|---|
| Entering | N |
| Leaving | Y |
| None | Same as the right-bottom corner point type |
| Segment across right boundary edge | Right-bottom corner point inside fill area? |
| Entering | N |
| Leaving | Y |
| None | Same as the right-top corner point type |
| Segment across top boundary edge | Right-top corner point inside fill area? |
| Entering | N |
| Leaving | Y |
| None | Same as the left-top corner point type |
| Segment across left boundary edge | Left-top corner point inside fill area? |
| Entering | N |
| Leaving | Y |
| None | Same as the left-bottom corner point type | across bottom boundary edge 1208, a left-bottom corner point 1216 is inside of a fill area if the line segment 1224 is leaving the pixel 1200 and outside of a fill area if the line segment 1224 is entering the pixel 1200. In the depicted embodiment of FIG. 12, line segment 1224 has a moving direction that indicates that the line segment 1224 is entering the pixel 1200, therefore, left-bottom corner point 1216 is outside of the fill area for this example case. If a segment does not cross a bottom boundary edge 1208, the left-bottom corner 1216 can have a same fill area as a right-bottom corner point type 1214. Such conditions and attributes are described for each corner point 1212, 1214, 1216, 1218 in Table 2.

Figure 13:
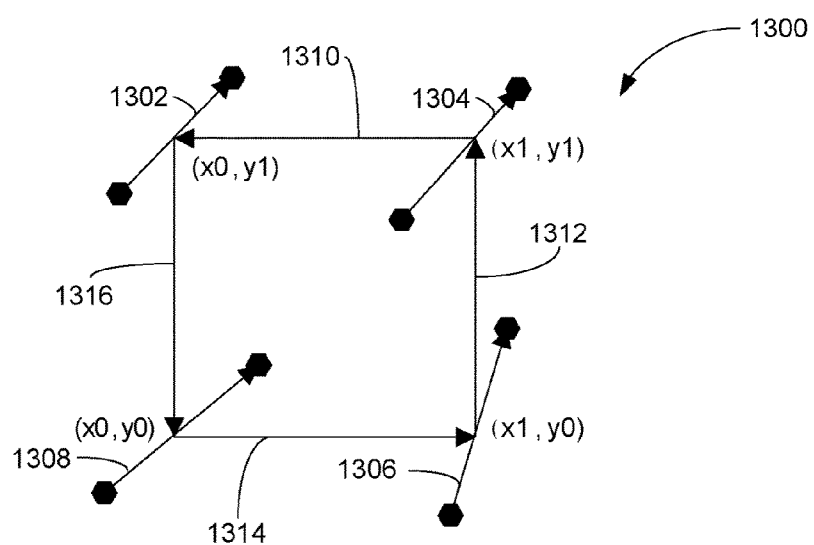
FIG. 13 depicts example line segments across corners of a pixel.

FIG. 13 depicts example line segments across corners of a pixel. A case can arise where one or more line segments 1302, 1304, 1306, 1308 intersect a pixel 1300 at one or more corner points (x0, y1), (x1, y1), (x1, y0), (x0, y0) of the pixel 1300. In other cases (not shown), one or more line segments can overlap with boundary edges 1310, 1312, 1314, 1316.

In such cases, determination of whether a corner point is inside or outside of a fill region can be ambiguous. In an embodiment, intersection values of a line segment 1302, 1304, 1308, 1306 with a current pixel boundary 1310, 1312, 1314, 1316 can be shifted by an amount to replace an intersection point at a corner point and eliminate the ambiguity. An original intersection point (x, y) can be replaced with two shifted intersection points to replace the original intersection point. For example, original intersection point (x0, y0) can be replaced with (x0+0.01, y0) and (x0, y0+0.01) as new intersection points, according to one embodiment. Similarly, when a line segment overlaps a pixel boundary edge 1310, 1312, 1314, 1316, the intersection point (x, y) can be replaced with (x+0.01, y) for horizontal boundary edges 1310, 1314 or replaced with (x, y+0.01) for vertical boundary edges 1312, 1316. Subject matter is not limited in this regard and other values or directions can be used to offset an intersection point in other embodiments.

Rules to govern the shifting of intersection points can be used by a coverage component to determine and record the intersection points into statistics data. In one embodiment, 8-bits are allocated for corner point type information (e.g., 2 bits for each corner) of a pixel. All corner point types can be initially set to an unknown mode. Subject matter is not limited in this regard and other data structures can be used to store information about corner points in other embodiments.

Thus, after a first pass, pixels having line segment access can have known corner point types (e.g., inside or outside), while pixels without line segment access can have unknown corner point types. In a second pass, a coverage value can be determined for pixels having unknown corner point types based on known corner point types of adjacent pixels.

In one embodiment, pixel boundary edges are iteratively scanned until an edge with known inside or outside corner points is found. Using the known corner point type of a determined pixel, unknown corner point types of an undetermined pixel to the left of the determined pixel can be filled according to the known corner type. For example, a scan of boundary edges can determine that a left-most edge of a pixel having known corner point type is outside of a fill area. Pixels to the left can subsequently be filled as outside corner point types.

Boundary edges having known corner point types can be skipped in the iterative scanning process because a coverage component may have already determined a coverage value for such pixels in a first pass. In this regard, pixels having known corner point types may already be "filled". Iterative scanning of boundary edges can continue and fill unknown corner point types with adjacent known corner point types. Such iterative scanning can continue until all scan lines are processed and all corner point types of pixels have been determined. Pixels having only outside corner points can be assigned a coverage value to indicate no fill such as, for example, a grayscale value of 0. Pixels having only inside corner points can be assigned a coverage to indicate a complete fill such as, for example, a grayscale value of 255.

Figure 14:
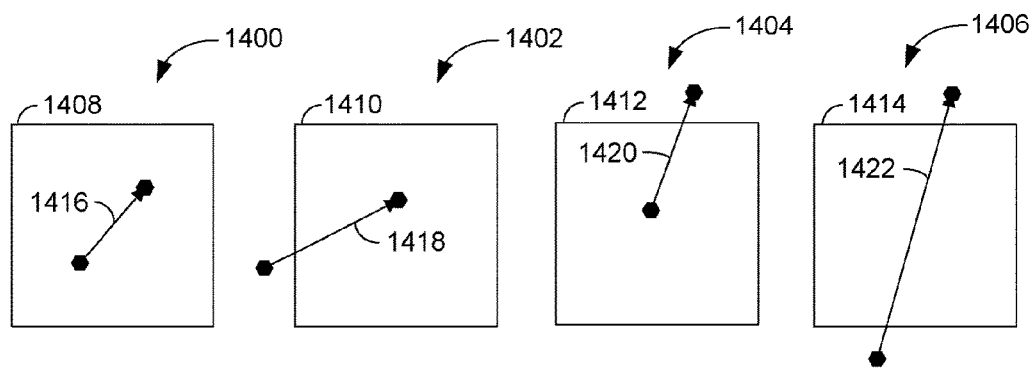
FIG. 14 depicts relationships between a line segment and a pixel boundary.

FIG. 14 depicts relationships between a line segment and a pixel boundary. A coverage impact value can be dependent on a relationship between a line segment and a pixel boundary.

In a first example case, a line segment 1416 can start and end within a pixel boundary 1408 of pixel 1400. In one embodiment, such case represents an invalid relationship of a line segment with a pixel boundary for purposes of calculating a coverage impact value. Information associated with line segment 1416 can be discarded or line segment 1416 can be merged to a single point, according to one or more embodiments.

In a second example case, a line segment 1418 can start outside of pixel boundary 1410, enter pixel boundary 1410, and end within pixel boundary 1410 of pixel 1402. Such case represents a relationship of a line segment with a pixel boundary for calculating a coverage impact value according to embodiments described herein.

In a third example case, a line segment 1420 can start within a pixel boundary 1412, exit pixel boundary 1412, and end outside of pixel boundary 1412 of pixel 1404. Such case represents another relationship of a line segment with a pixel boundary for calculating a coverage impact value.

In a fourth example case, a line segment 1422 can start outside of a pixel boundary 1414, enter and exit pixel boundary 1414, and end outside of pixel boundary 1414 of pixel 1406. Such case represents yet another relationship of a line segment with a pixel boundary for coverage impact calculation purposes. Although particular orientations are depicted in the embodiments of FIG. 14, subject matter is not limited in this regard and can include other embodiments where line segments enter and/or exit, or start and/or stop, according to other orientations.

According to various embodiments, a pixel 1402 can be partitioned into a a grid such as, for example, an x/y coordinate grid, and the endpoints of a line segment 1418 can be described in relation to the grid. In one embodiment, a grid for a pixel 1402 comprises a 16×16 grid. Other grid configurations can be used in other embodiments.

Figure 15:
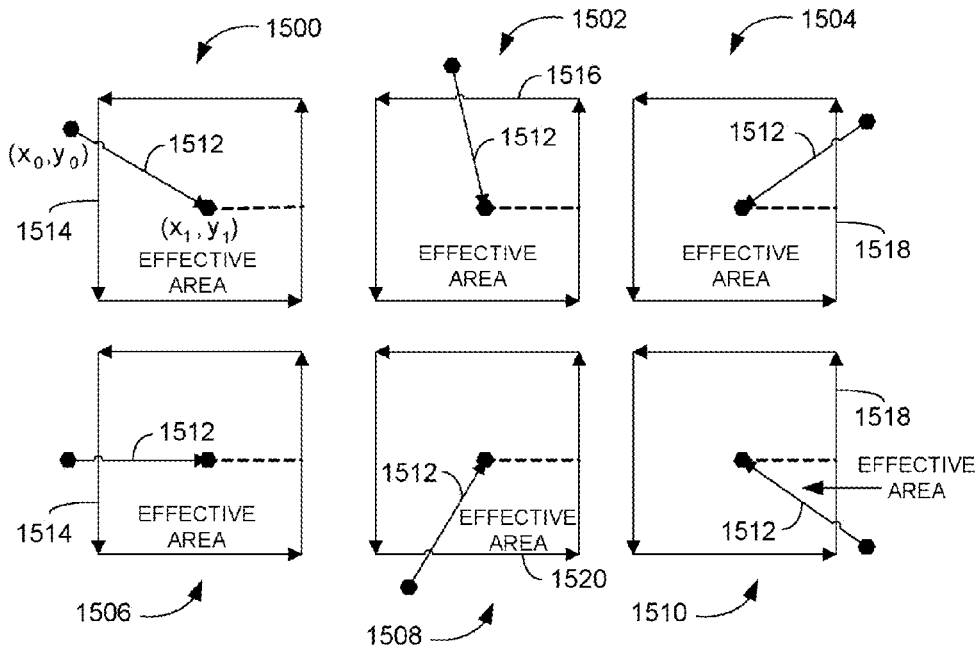
FIG. 15 depicts a variety of cases of a line segment entering a pixel.

FIG. 15 depicts a variety of cases of a line segment entering a pixel. In the examples depicted in FIG. 15, a line segment 1512 can enter a pixel by crossing a left boundary edge 1514, a top boundary edge 1516, a right boundary edge 1518, or a bottom boundary edge 1520.

Pixel coverage impact, g, represents an area of a pixel that is inside of a glyph and can be used to calculate a coverage value, G, for a pixel using, for example, equation (10). In an embodiment, a right side of a moving direction of a line segment 1512 correlates with a region that is inside of a glyph. A moving direction of line segment 1512 is indicated by the direction of the arrow of line segment 1512.

Thus, coverage impact, g, can correspond with an effective area (EA) of the example pixels 1500, 1502, 1504, 1506, 1508, 1510. The effective area can be a region within the pixel bounded by pixel boundary edges 1514, 1516, 1518, 1520, a dashed reference line, and the line segment 1512 that includes the area on the right side of the moving direction of the line segment 1512. The dashed reference line can extend horizontally from line segment 1512 endpoint within the pixels to the right boundary 1518 as depicted, according to one embodiment. Other orientations for a reference line can be used in other embodiments.

As depicted with respect to example pixels 1500 and 1506, a line segment 1512 can enter pixel 1500 across a left boundary edge 1514. Line segment 1512 can start at coordinate $(x_0, y_0)$, enter a pixel 1500 by intersecting left boundary edge 1514, and end at coordinate $(x_1, y_1)$ within the pixel 1500. As depicted with respect to pixel 1502, a line segment 1512 can start at coordinate $(x_0, y_0)$, enter pixel 1502 across a top boundary edge 1516, and end at coordinate $(x_1, y_1)$ within the pixel 1502. As depicted with respect to pixels 1504 and 1510, line segment 1512 can start at coordinate $(x_0, y_0)$, enter pixel 1500 by intersecting right boundary edge 1518, and end at coordinate $(x_1, y_1)$ within the pixel 1500. As depicted with respect to pixel 1508, line segment 1512 can start at coordinate $(x_0, y_0)$, enter pixel 1500 by intersecting bottom boundary edge 1520, and end at coordinate $(x_1, y_1)$ within the pixel 1500.

In an embodiment, coordinates for a current pixel in processing $(px_i, py_i)$ and the respective start $(x_0, y_0)$ and end $(x_1, y_1)$ coordinates of an accessing line segment 1512 are used to calculate a coverage impact value, g, such as grayscale impact, according to the following equations and/or principles embodied therein:

$$g = \begin{cases} 16*\left(y_1 - 16*py_i + \dfrac{1}{2}(x_1 - 16*px_i)(y_{left} - y_1)\right) & \text{if } y_{left} \geq y_1 \text{ \& } y_{left} \leq 16 + \\ & 16*py_i \text{ \& } x_0 < 16*px_i \\ 16*(y_1 - 16*py_i) + \dfrac{1}{2}(x_1 - 16*px_i + x_{top})(16 + 16*py_i - y_1) & \text{if } x_{top} > 16*px_i \text{ \& } x_{top} \leq 16 + \\ & 16*px_i \text{ \& } y_0 \geq 16 + 16*py_i \\ 256 - \dfrac{1}{2}(16 + 16*px_i - x_1)(y_{right} - y_1) & \text{if } y_{right} \geq y_1 \text{ \& } y_{right} \leq 16 + \\ & 16*py_i \text{ \& } x_0 \geq 16 + 16*px_i \\ 16*(y_1 - 16*py_i) - \dfrac{1}{2}(x_1 - 16*px_i)(y_1 - y_{left}) & \text{if } y_{left} < y_1 \geq 16* \\ & py_i \text{ \& } x_0 < 16*px_i \\ \dfrac{1}{2}(16 + 16*px_i - x_1 + x_{bottom})(y_1 - 16*py_i) & \text{if } x_{bottom} > 16*px_i \text{ \& } x_{bottom} \leq \\ & 16 + 16*px_i \text{ \& } y_0 < 16*py_i \\ \dfrac{1}{2}(16 + 16*px_i - x_1)(y_1 - y_{right}) & \text{if } y_{right} < y_1 \text{ \& } y_{right} \geq \\ & 16*py_i \text{ \& } x_0 \geq 16 + 16*px_i \end{cases} \quad (17)$$

where $$y_{left} = y_1 - \frac{y_1 - y_0}{x_1 - x_0}(x_1 - 16*px_i) \quad (18)$$

$$y_{right} = y_1 - \frac{y_1 - y_0}{x_1 - x_0}(x_1 - 16*px_i - 16)$$

$$x_{top} = x_1 - \frac{x_1 - x_0}{y_1 - y_0}(y_1 - 16*py_i - 16)$$

$$x_{bottom} = x_1 - \frac{x_1 - x_0}{y_1 - y_0}(y_1 - 16*py_i)$$

The usage of the values 16 and/or 256 in equations (17) and (18) reflects a coverage scheme that uses a 16×16 grid within each pixel to determine an area that corresponds with 256 shades of grayscale. Other values can be used to reflect other coverage schemes in other embodiments. For purposes of calculating coverage impact value, a bottom-left corner point of pixel 1500 can, for example, correspond with a value (16*$px_i$, 16*$py_i$), a top-left corner point of pixel 1500 can correspond with a value (16*$px_i$, 16+16*$py_i$), a top-right corner point of pixel 1500 can correspond with a value (16+16*$px_i$, 16+16*$py_i$), and bottom-right corner point of pixel 1500 can correspond with a value (16+16*$px_i$, 16*$py_i$). Other values can be used in other configurations and/or embodiments.

Figure 16:
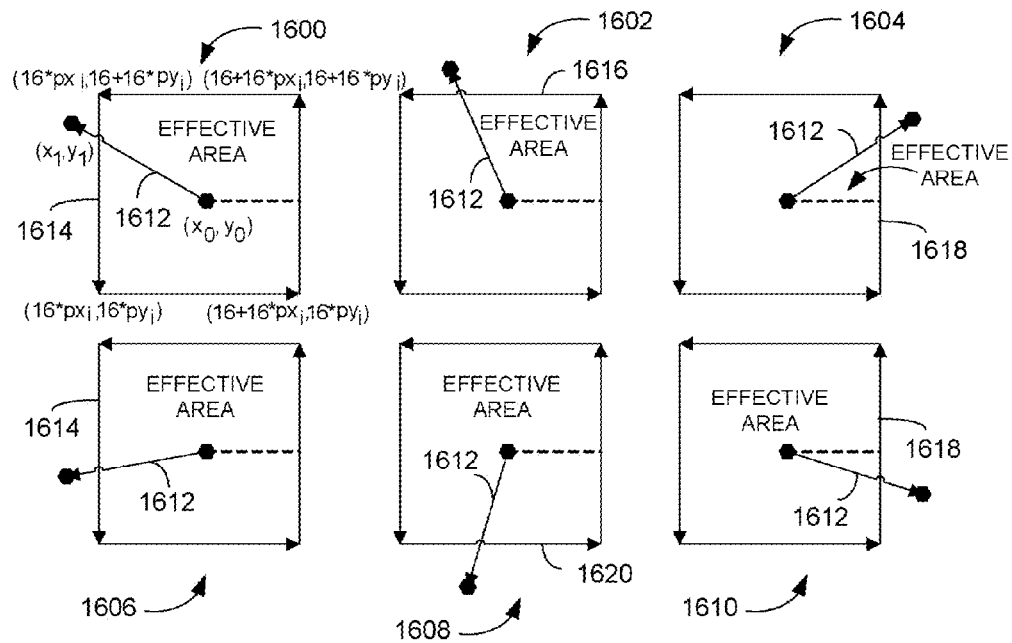
FIG. 16 depicts a variety of cases of a line segment leaving a pixel.

FIG. 16 depicts a variety of cases of a line segment leaving a pixel. In the examples depicted in FIG. 16, a line segment 1612 can leave a pixel by crossing a left boundary edge 1614, a top boundary edge 1616, a right boundary edge 1618, or a bottom boundary edge 1620. FIG. 16 depicts similar examples shown with respect to FIG. 15, but where the line segment 1614 has an opposite moving direction.

According to one or more embodiments, calculation of coverage impact for a line segment 1614 that starts within a pixel and leaves the pixel can be similarly derived as equations (17) and (18). For example, an effective area for example pixels 1600, 1602, 1604, 1606, 1608, 1610 can be a region bounded by the dashed reference line and the line segment 1612 that includes the area on the right side of the moving direction of the line segment 1612. The dashed reference line can extend horizontally from the line segment 1612 endpoint within the pixel to the right boundary 1618 as depicted, according to one embodiment. The dashed reference line can include other orientations in other embodiments.

Figure 17:
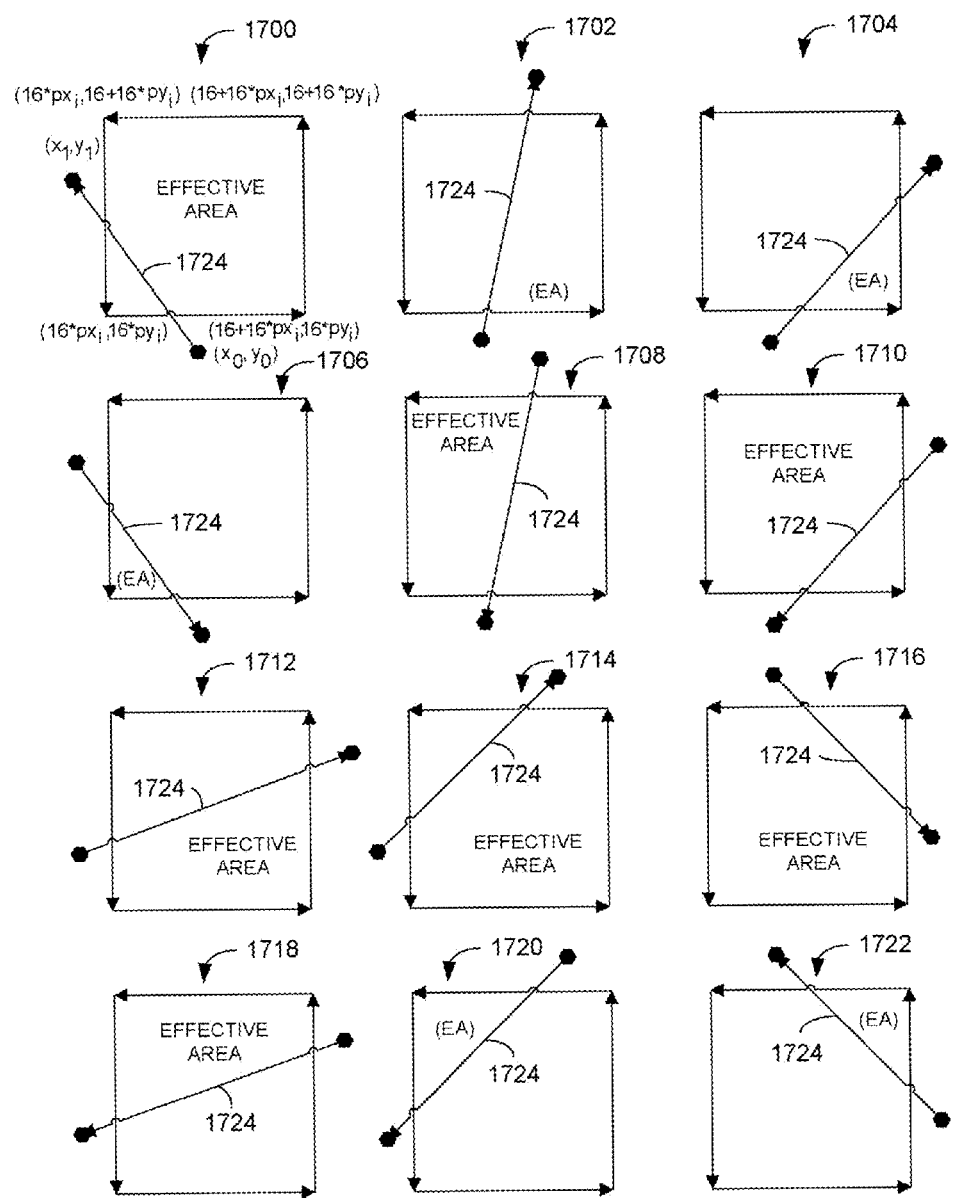
FIG. 17 depicts a variety of cases of a line segment crossing a pixel.

FIG. 17 depicts a variety of cases of a line segment crossing a pixel. In the examples provided in FIG. 17, a line segment 1724 starts outside of a pixel at coordinate ($x_0$, $y_0$), crosses a boundary edge to enter to the pixel, crosses another boundary edge to leave the pixel, and ends outside of the pixel at coordinate ($x_1$, $y_1$).

An effective area representing a coverage impact value is depicted with respect to a number of example pixels 1700, 1702, 1704, 1706, 1708, 1710, 1712, 1714, 1716, 1718, 1720, 1722 using a shaded region. A coverage impact value, g, can be calculated for such cases using local coordinates ($px_i$, $py_i$) of a currently processed pixel 1700, 1702, 1704, 1706, 1708, 1710, 1712, 1714, 1716, 1718, 1720, 1722 and endpoint coordinates ($x_0$, $y_0$) and ($x_1$, $y_1$) of line segment 1724 according to the following:

$$g = \begin{cases} 256 - \frac{1}{2}(x_{bottom} - 16*px_i)(y_{left} - 16*py_i) & \text{if } y_{left} \leq 16 + 16*py_i, \&y_{left} > 16*py_i, \&x_{bottom} \leq \\ & 16 + 16*px_i, \&x_{bottom} > 16*px_i, \&y_0 < 16*py_i \\ \frac{1}{2}(x_{bottom} - 16*px_i)(y_{left} - 16*py_i) & \text{if } y_{left} \leq 16 + 16*py_i, \&y_{left} > 16*py_i, \&x_{bottom} \leq \\ & 16 + 16*px_i, \&x_{bottom} > 16*px_i, \&y_1 < 16*py_i \\ 8(32 + 32*px_i - x_{bottom} - x_{top}) & \text{if } y_{top} \leq 16 + 16*py_i, \&y_{top} > 16*px_i, \&x_{bottom} \leq \\ & 16 + 16*px_i, \&x_{bottom} > 16*px_i, \&y_0 < 16*py_i \\ 256 - 8(32 + 32*px_i - x_{bottom} - x_{top}) & \text{if } y_{top} \leq 16 + 16*py_i, \&y_{top} > 16*px_i, \&x_{bottom} \leq \\ & 16 + 16*px_i, \&x_{bottom} > 16*px_i, \&y_1 < 16*py_i \\ \frac{1}{2}(16 + 16*px_i - x_{bottom})(y_{right} - 16*py_i) & \text{if } y_{right} \leq 16 + 16*py_i, \&y_{right} > 16*py_i, \&x_{bottom} \leq \\ & 16 + 16*px_i, \&x_{bottom} > 16*px_i, \&y_0 < 16*py_i \\ 256 - \frac{1}{2}(16 + 16*px_i - x_{bottom})(y_{left} - 16*py_i) & \text{if } y_{right} \leq 16 + 16*py_i, \&y_{right} > 16*py_i, \&x_{bottom} \leq \\ & 16 + 16*px_i, \&x_{bottom} > 16*px_i, \&y_1 < 16*py_i \\ 8(32 + 32*py_i - x_{left} - x_{right}) & \text{if } y_{left} \leq 16 + 16*py_i, \&y_{left} > 16*py_i, \&x_{right} \leq \\ & 16 + 16*py_i, \&x_{right} > 16*py_i, \&x_0 < 16*px_i \\ 256 - 8(32 + 32*py_i - x_{left} - x_{right}) & \text{if } y_{left} \leq 16 + 16*py_i, \&y_{left} > 16*py_i, \&x_{right} \leq \\ & 16 + 16*py_i, \&y_{right} > 16*py_i, \&x_1 < 16*px_i \\ 256 - \frac{1}{2}(16 + 16*py_i - y_{left})(x_{top} - 16*px_i) & \text{if } y_{left} \leq 16 + 16*py_i, \&y_{left} > 16*py_i, \&x_{top} \leq \\ & 16 + 16*px_i, \&x_{top} > 16*px_i, \&x_0 < 16*px_i \\ \frac{1}{2}(16 + 16*py_i - y_{left})(x_{top} - 16*px_i) & \text{if } y_{left} \leq 16 + 16*py_i, \&y_{left} > 16*py_i, \&x_{top} \leq \\ & 16 + 16*px_i, \&x_{top} > 16*px_i, \&x_1 < 16*px_i \\ \frac{1}{2}(16 + 16*py_i - y_{right})(16 + 16*px_i - x_{top}) & \text{if } y_{right} \leq 16 + 16*py_i, \&y_{right} > 16*py_i, \&x_{top} \leq \\ & 16 + 16*px_i, \&x_{top} > 16*px_i, \&y_1 < 16*py_i \\ 256 - \frac{1}{2}(16 + 16*py_i - y_{right})(16 + 16*px_i - x_{yop}) & \text{if } y_{right} \leq 16 + 16*py_i, \&y_{right} > 16*py_i, \&x_{top} \leq \\ & 16 + 16*px_i, \&x_{top} > 16*px_i, \&y_0 < 16*py_i \end{cases} \quad (19)$$

Equation (19) can comprise values such as 8 and 16 and multiples of 16 that reflect calculation of a coverage impact value for 256 shades of grayscale according to one embodiment. Other constant values can be used in place of 8 and 16 and multiples of 16 in equation (19) in accordance with similar principles of calculation in other embodiments.

Figure 18:
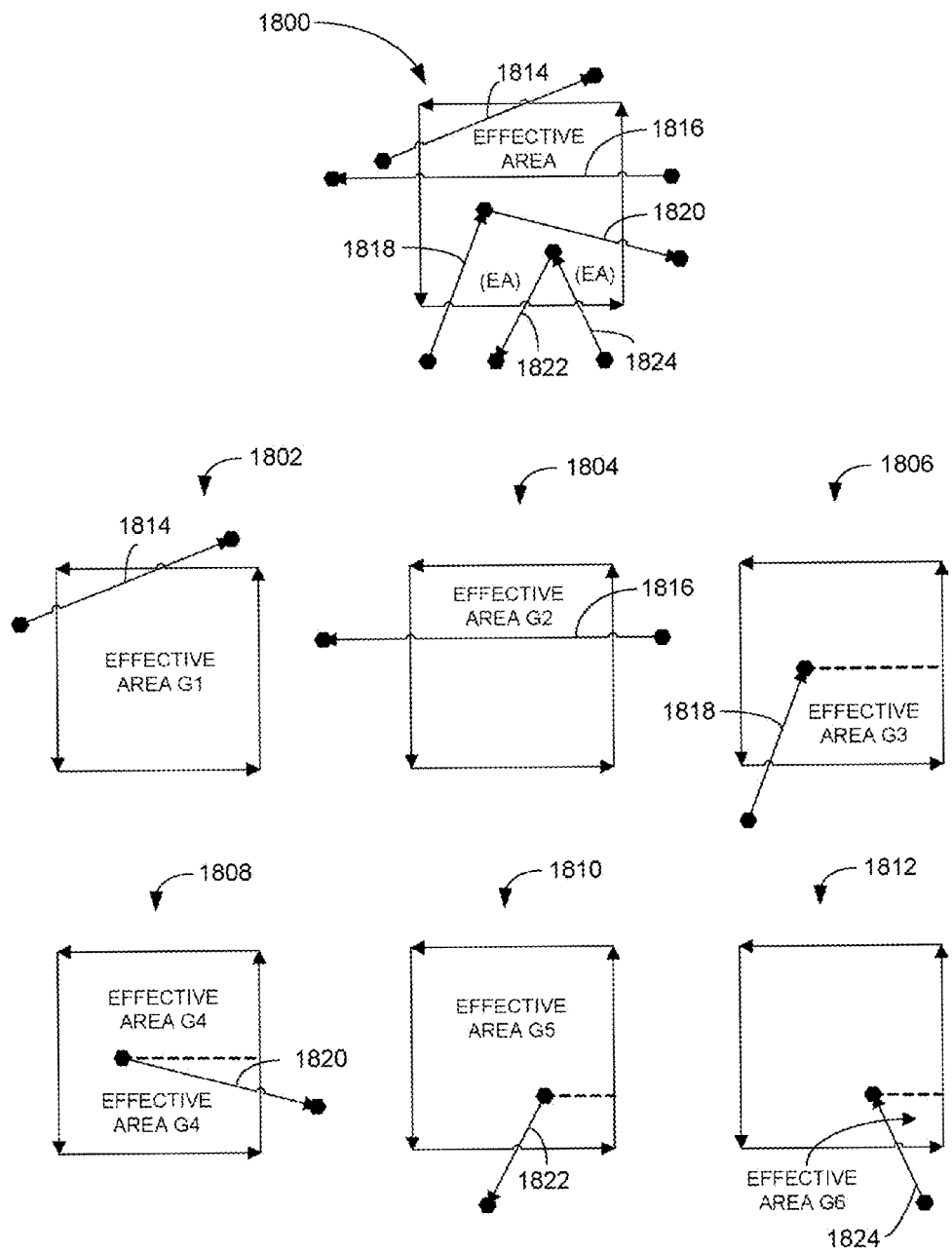
FIG. 18 depicts a comprehensive example of line segments entering, leaving, and crossing a pixel.

FIG. 18 depicts a comprehensive example of line segments entering, leaving, and crossing a pixel. In an embodiment, a pixel 1800 can be accessed by a variety of line segments 1814, 1816, 1818, 1820, 1822, 1824 across multiple boundary edges in a variety of orientations. Pixel 1800 depicts a comprehensive effective area based on the multiple line segments 1814, 1816, 1818, 1820, 1822, 1824. Example pixels 1802, 1804, 1806, 1808, 1810, 1812 depict the respective effective area g1, g2, g3, g4, g5, g6 for each line segment 1814, 1816, 1818, 1820, 1822, 1824 individually.

In an embodiment, a comprehensive pixel coverage impact value can be calculated for a pixel 1800 that is accessed by multiple line segments 1814, 1816, 1818, 1820, 1822, 1824 by initializing a pixel coverage value to 0 and adding the individual coverage impact values for each line segment together. When an individual coverage impact value causes the pixel coverage value to exceed a pre-determined limit (e.g., 256), the value of the pre-determined limit can be subtracted from the comprehensive pixel coverage impact value. For example, a comprehensive pixel coverage impact value, g, for pixel 1800 can be calculated by adding the individual effective areas g1, g2, g3, g4, g5, g6 and subtracting 256*3 because a limit of 256 is exceeded three times in this particular example. Other pre-determined limits can be used in other embodiments.

Figure 19:
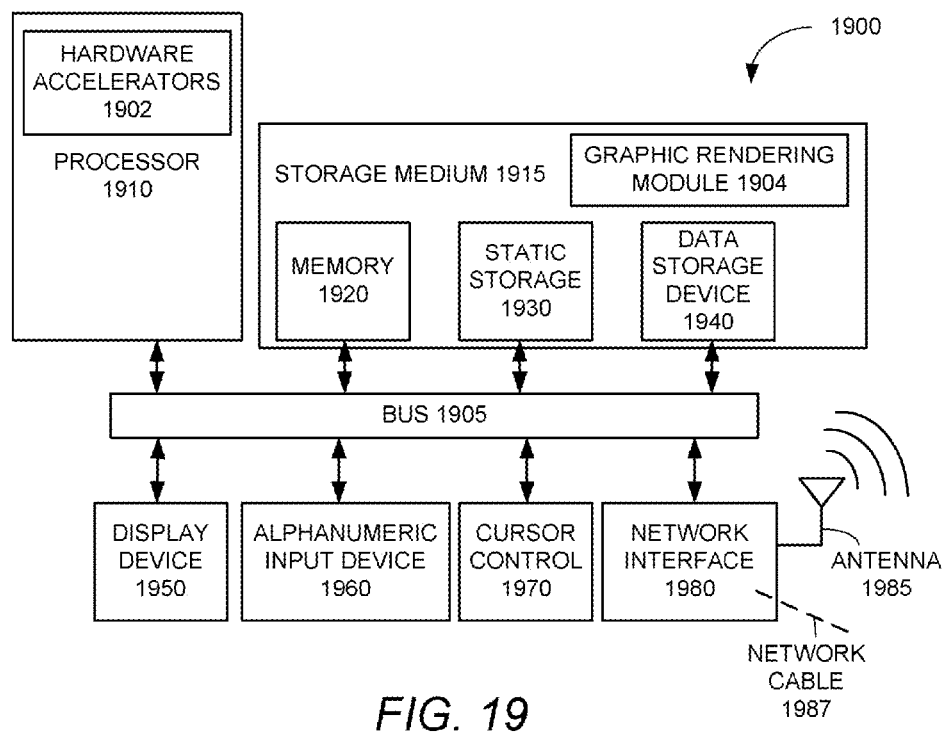
FIG. 19 is a schematic diagram of an electronic system for performing graphics rendering techniques.

FIG. 19 is a schematic diagram of an electronic system 1900 for performing graphics rendering techniques as described herein. Electronic system 1900 may accord with embodiments already described herein, including, for example, embodiments described with respect to rendering architecture 400 and 600. In an embodiment, electronic system 1900 is intended to represent a range of electronic devices (either wired or wireless). In an embodiment, electronic system 1900 represents a variety of devices including, for example, desktop computer devices, laptop computer devices, personal computers (PC), telephones, personal digital assistants (PDA) including cellular-enabled PDAs, set top boxes, pocket PCs, tablet PCs, DVD players, video players, televisions, printers, or servers, but is not limited to these examples and can include other electronic devices. Alternative electronic systems can include more, fewer and/or different components. Electronic system 1900 may include an article of manufacture as described herein, including, for example, storage medium 1915, according to various embodiments.

Electronic system 1900 can include bus 1905 or other communication device or interface to communicate information, and processor 1910 coupled to bus 1905 that can process information. Bus 1905 can be a single system bus or a number of buses of the same or different types bridged together. System 1900 can include one or more processors 1910 and/or co-processors. In an embodiment, system 1900 includes one or more hardware accelerators 1902 configured to perform Bezier curve decomposition and/or to determine, calculate, and/or update a pixel coverage value according to embodiments described herein. Processor 1910 can include any of a variety of components or functionality to generate and output images to display device 1950 including, for example, video or other graphics processors or controllers.

System 1900 can also include a storage medium 1915, which can include a variety of types of storage, coupled to bus 1905 to store information and/or instructions that can be processed and/or executed by processor 1910. Storage medium 1915 can include more or less types of storage than depicted according to various embodiments. In an embodiment, instructions to implement or perform actions described herein are stored in storage medium 1915. The instructions can be in the form of firmware or software according to various embodiments. Storage medium 1915 can include a graphic rendering module 1904 configured to perform actions in accordance with embodiments described herein. For example, graphic rendering module 1904 can be configured to render a graphic comprising a plurality of line segments, automatically detect one or more rendering errors of the graphic, and correct the one or more rendering errors. Graphic rendering module 1904 can be stored, for example, in memory 1920, static storage 1930, or a data storage device 1940. Subject matter is not limited in this regard and module 1904 can be stored in other types of storage medium 1915 in other embodiments.

In an embodiment, system 1900 includes random access memory (RAM) or other storage device 1920 (may be referred to as "memory"), coupled to bus 1905. Memory 1920 can also be used to store temporary variables or other intermediate information during execution of instructions by processor 1910. Memory 1920 is a flash memory device in one embodiment. Graphic rendering module 1904 and/or instructions to perform actions associated with graphics rendering, as described herein, can be stored in memory 1920.

System 1900 can also include read only memory (ROM) and/or other static storage device 1930 coupled to bus 1905 that can store static information and instructions for processor 1910. In an embodiment, graphic rendering module 1904 and/or instructions to perform actions associated with graphics rendering, as described herein, are stored in static storage 1930. Data storage device 1940 can be coupled to bus 1905 to store information and instructions. Data storage device 1940 such as a magnetic disk or optical disc and corresponding drive can be coupled with electronic system 1900. In an embodiment, graphic rendering module 1904 and/or instructions to perform actions associated with graphics rendering, as described herein, are stored in data storage device 1940.

In an embodiment, an article of manufacture is disclosed. The article of manufacture can include a storage medium 1915 or other computer-readable medium having instructions stored thereon that, if executed, result in the actions described herein. Electronic system 1900 can include an article of manufacture comprising a storage medium 1915 and a plurality of instructions stored in the storage medium 1915 configured to perform actions associated with graphics rendering, as described herein.

Electronic system 1900 can also be coupled via bus 1905 to display device 1950, such as a cathode ray tube (CRT), plasma, or liquid crystal display (LCD), to display information to a user. In an embodiment, a display 1950 is coupled with the processor 1910 to display one or more graphics rendered according to architectures and methods described herein. Alphanumeric input device 1960, including alphanumeric and other keys, can be coupled to bus 1905 to communicate information and command selections to processor 1910. Cursor control 1970 can be another type of input device and can include, for example, a mouse, a trackball, or cursor direction keys to communicate information and command selections to processor 1910 and to control cursor movement on display 1950.

Electronic system 1900 can further include one or more network interfaces 1980 to provide access to network 1920, such as a local area network, but is not limited in this regard. Network interface 1980 can include, for example, a wireless network interface having antenna 1985, which can represent one or more antennae. Network interface 1980 can also include, for example, a wired network interface to communicate with remote devices via network cable 1987, which can be, for example, an Ethernet cable, a coaxial cable, a fiber optic cable, a serial cable, or a parallel cable.

In one embodiment, network interface 1980 can provide access to a local area network, for example, by conforming to an Institute of Electrical and Electronics Engineers (IEEE) standard such as IEEE 802.11b and/or IEEE 802.11g standards, and/or the wireless network interface can provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Previous or subsequent versions of the Bluetooth standard can also be supported.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments illustrated and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method for rendering a graphic in a rendering process, wherein the graphic comprises a plurality of line segments, the method comprising:
   in a first pass of the rendering process, processing each of the plurality of line segments of the graphic to determine a plurality of pixels through which the plurality of line segments pass, and
   in a second pass of the rendering process, processing each of the plurality of pixels through which the plurality of line segments pass to determine whether at least two of the plurality of line segments pass through a single pixel of the plurality of pixels;
   automatically detecting one or more rendering errors of the graphic, wherein an error is detected in response to at least two of the plurality of line segments being determined to pass through a single pixel of the plurality of pixels; and
   based on one or more rendering errors being detected, correcting the one or more rendering errors.

2. The method of claim 1, wherein processing each of the plurality of line segments is performed, line segment by line segment, to collect statistics information for each of the plurality of pixels through which the plurality of line segments pass; and wherein processing each of the plurality of pixels through which the plurality of line segments pass is performed in raster scan order, in order to at least determine a coverage value for each of the plurality of pixels.

3. The method of claim 2, wherein the statistics information includes one or more of the following: visited, area, wind strength, and wind area.

4. The method of claim 2, wherein the coverage value is a grayscale value, wherein the grayscale value is represented by $G(x, y)$ and determined according to the following:

$$G(x, y) = \begin{cases} W(x, y) & \text{if } |W(x, y) - a(x, y)| < 8 \\ W(x, y) & \text{if } |W(x, y) + a(x, y)| > 248 \\ \frac{1}{2}[W(x, y) + a(x, y)] & \text{otherwise} \end{cases}$$

where x and y indicate a position of a pixel of the plurality of pixels, W(x, y) represents accumulated wind area, and a(x, y) represents an associated area.

5. The method of claim 1, wherein detecting one or more rendering errors of the graphic is performed during the second pass to detect a condition in which at least two of the plurality of line segments (i) have a similar moving direction, and (ii) pass through a single pixel of the plurality of pixels, wherein the condition is indicative of a rendering error.

6. The method of claim 1, wherein detecting one or more rendering errors of the graphic is performed according to the following:

$$\text{error\_detected} = \begin{cases} 1 & \text{if } s(x, y) > 16 \text{ or } w(x, y) > 256 \\ 1 & \text{if } |W(x, y) - a(x, y)| > 16 \text{ or } |W(x, y) + a(x, y)| < 240 \\ 0 & \text{otherwise} \end{cases}$$

where x and y indicate a position of a pixel of the plurality of pixels, 1 indicates that an error is detected, 0 indicates that an error is not detected, s(x, y) represents a wind strength, w(x, y) represents a wind area, W(x, y) represents accumulated wind area, and a(x, y) represents an associated area.

7. The method of claim 1, wherein correcting the one or more rendering errors comprises re-rendering the graphic at a higher resolution to avoid a condition where two of the plurality of line segments have a similar moving direction and pass through a single pixel of the plurality of pixels.

8. The method of claim 1, further comprising performing area-based anti-aliasing including:
determining whether one or more corner points of each pixel of the plurality of pixels through which the plurality of line segments pass is inside or outside of a fill area; and
determining a coverage value for one or more pixels of the plurality of pixels based at least in part on the one or more corner points being inside or outside of the fill area.

9. The method of claim 8, wherein performing area-based anti-aliasing further comprises:
filling one or more pixels by
iteratively scanning boundary edges of one or more pixels until a boundary edge having a corner point inside or outside of the fill area is found, and
determining a coverage value for one or more pixels adjacent to the boundary edge having the corner point inside or outside of the fill area, based at least in part on the corner point being inside or outside of the fill area.

10. The method of claim 8, wherein whether one or more corner points of each pixel of the plurality of pixels through which the plurality of line segments pass is inside or outside of a fill area comprises is determined by:
conceptually shifting a corner point in a direction to avoid a condition where a line segment of the plurality of line segments passes through the corner point.

11. The method of claim 1, wherein the graphic comprises at least one of a glyph or a scalable vector graphic.

12. The method of claim 1, further comprising:
applying Bezier decomposition of one or more curves to provide at least one of the plurality of line segments.

13. The method of claim 2, further comprising:
calculating or updating the statistics information for each of the plurality of pixels through which the plurality of line segments pass.

14. The method of claim 1, wherein the rendering process of the graphic is performed, in parallel, on line segments of the plurality of line segments, to provide scalability over memory limitations.

15. An apparatus comprising:
a processor;
a storage medium coupled to the processor; and
a module stored on the storage medium, the module configured to
render a graphic comprising a plurality of line segments by
processing, via the processor, each of the plurality of line segments of the graphic to determine a plurality of pixels through which the plurality of line segments pass in a first rendering pass, and
processing, via the processor, each of a plurality of pixels through which the plurality of line segments pass in a second rendering pass to determine whether at least two of the plurality of line segments pass through a single pixel of the plurality of pixels,
wherein the module is further configured to
automatically detect one or more rendering errors of the graphic, wherein an error is detected in response to at least two of the plurality of line segments being determined to pass through a single pixel of the plurality of pixels, and
based on one or more rendering errors being detected, correct the one or more rendering errors.

16. The apparatus of claim 15, wherein the processor is configured to process each of the plurality of line segments, line segment by line segment, to collect statistics information for each of the plurality of pixels through which the plurality of line segments pass; and
wherein the processor is further configured to process each of the plurality of pixels through which the plurality of line segments pass in raster scan order, in order to at least determine a coverage value for each of the plurality of pixels.

17. The apparatus of claim 16, further comprising:
one or more hardware accelerators operatively coupled with the module to calculate a coverage impact for the plurality of line segments and update the statistics information based on the calculated coverage impact for each of the plurality of pixels through which the plurality of line segments pass, wherein the statistics information includes the following: visited, area, wind strength, and wind area.

18. The apparatus of claim 16, wherein the coverage value is a grayscale value, wherein the grayscale value is represented by G(x, y), and determined according to the following:

$$G(x, y) = \begin{cases} W(x, y) & \text{if } |W(x, y) - a(x, y)| < 8 \\ W(x, y) & \text{if } |W(x, y) + a(x, y)| > 248 \\ \frac{1}{2}[W(x, y) + a(x, y)] & \text{otherwise} \end{cases}$$

where x and y indicate a position of a pixel of the plurality of pixels, W(x, y) represents accumulated wind area, and a(x, y) represents an associated area.

19. The apparatus of claim 15, wherein the module is configured to automatically detect one or more rendering errors of the graphic during the second pass to detect a condition in which at least two of the plurality of line segments have a similar moving direction and pass through a single pixel of the plurality of pixels, wherein the condition is indicative of an error.

20. The apparatus of claim 15, wherein the module is configured to detect one or more rendering errors of the graphic according to the following:

$$\text{error\_detected} = \begin{cases} 1 & \text{if } s(x, y) > 16 \text{ or } w(x, y) > 256 \\ 1 & \text{if } |W(x, y) - a(x, y)| > 16 \text{ or } |W(x, y) + a(x, y)| < 240 \\ 0 & \text{otherwise} \end{cases}$$

where x and y indicate a position of a pixel of the plurality of pixels, 1 indicates that an error is detected, 0 indicates that an error is not detected, s(x, y) represents a wind strength, w(x, y) represents a wind area, W(x, y) represents accumulated wind area, and a(x, y) represents an associated area.

\* \* \* \* \*